US011875635B2

United States Patent
(12) United States Patent
Gupta et al.

(10) Patent No.: US 11,875,635 B2
(45) Date of Patent: Jan. 16, 2024

(54) MOBILE GAMING SYSTEM FOR REMOTE GAME PLAY

(71) Applicant: Aristocrat Technologies, Inc., Las Vegas, NV (US)

(72) Inventors: Ashish Gupta, Uttar Pradesh (IN); Sina Miri, Menlo Park, CA (US); Yuval Mekler, London (GB); Mayank Agarwal, Uttar Pradesh (IN); Vinay Khandelwal, Uttar Pradesh (IN); Pardeep Rathee, Haryana (IN); Nitin Varshney, Uttar Pradesh (IN); Milind Shrivastava, Uttar Pradesh (IN)

(73) Assignee: Aristocrat Technologies, Inc., Las Vegas, NV (US)

( * ) Notice: Subject to any disclaimer, the term of this patent is extended or adjusted under 35 U.S.C. 154(b) by 76 days.

(21) Appl. No.: 17/443,745

(22) Filed: Jul. 27, 2021

(65) Prior Publication Data

US 2022/0036692 A1 Feb. 3, 2022

Related U.S. Application Data

(60) Provisional application No. 63/112,400, filed on Nov. 11, 2020, provisional application No. 63/058,128, filed on Jul. 29, 2020.

(51) Int. Cl.
*G07F 17/32* (2006.01)
*A63F 3/06* (2006.01)

(52) U.S. Cl.
CPC ........ *G07F 17/3223* (2013.01); *A63F 3/0645* (2013.01); *G07F 17/3244* (2013.01); *G07F 17/3267* (2013.01)

(58) Field of Classification Search
CPC ............ G07F 17/3223; G07F 17/3244; G07F 17/3267; A63F 3/0645
See application file for complete search history.

(56) References Cited

U.S. PATENT DOCUMENTS 5,830,067 A 11/1998 Graves
5,967,895 A 10/1999 Kellen
(Continued)

OTHER PUBLICATIONS

Office Action (Non-Final Rejection) dated Jun. 24, 2022 for U.S. Appl. No. 17/491,200 (pp. 1-11).
(Continued)

*Primary Examiner* — Werner G Garner
(74) *Attorney, Agent, or Firm* — Armstrong Teasdale LLP

(57) ABSTRACT

A mobile support system for providing wagering game play to a plurality of mobile devices is provided. The system is configured to receive a play request for the wagering game from a mobile device, where the play request includes a wager amount and represents placement of a wager for an instance of game play of the wagering game. The system generates an instance of game source data for the wagering game and identifies a game play data set used for the play request. Prior to performing a withdrawal transaction of the wager amount for the play request, the system generate a wager outcome for the play request by comparing the game source data with the game play data set. After determining the wager outcome for the play request, the system causes the withdrawal transaction of the wager amount to be performed, thereby completing a placement of the wager amount.

20 Claims, 18 Drawing Sheets

(56) References Cited

U.S. PATENT DOCUMENTS

| | | | | |
|---|---|---|---|---|
| 6,183,362 | B1 | 2/2001 | Boushy | |
| 6,306,038 | B1 | 10/2001 | Graves | |
| 6,311,976 | B1 | 11/2001 | Yoseloff | |
| 6,988,946 | B2 | 1/2006 | Michaelson | |
| 7,066,815 | B2 | 6/2006 | Walker | |
| 7,128,652 | B1 | 10/2006 | Lavoie | |
| 7,524,244 | B2 | 4/2009 | Walker | |
| 7,588,495 | B2 | 9/2009 | Walker | |
| 7,727,071 | B2 | 6/2010 | Giobbi | |
| 7,785,183 | B1 * | 8/2010 | Stockham | G07F 17/3258 463/13 |
| 7,806,761 | B2 | 10/2010 | Walker | |
| 7,815,502 | B2 | 10/2010 | Hardy | |
| 8,475,257 | B2 | 7/2013 | Bienvenue | |
| 9,305,427 | B2 | 4/2016 | Walker | |
| 9,558,619 | B2 | 1/2017 | Froy | |
| 9,659,435 | B2 | 5/2017 | Rogers | |
| 9,659,459 | B2 | 5/2017 | Phillips | |
| 9,922,493 | B2 | 3/2018 | Walker | |
| 10,269,209 | B2 | 4/2019 | Miltenberger | |
| 10,726,670 | B2 | 7/2020 | Price | |
| 11,508,217 | B2 | 11/2022 | Harris | |
| 2001/0007815 | A1 | 7/2001 | Philipsson | |
| 2002/0094860 | A1 | 7/2002 | Itkis | |
| 2004/0053694 | A1 | 3/2004 | Rowe | |
| 2004/0082384 | A1 * | 4/2004 | Walker | G07F 17/3239 463/40 |
| 2004/0148251 | A1 | 7/2004 | Kavoun | |
| 2004/0248645 | A1 | 12/2004 | Blackburn | |
| 2005/0059467 | A1 | 3/2005 | Saffari | |
| 2005/0187014 | A1 | 8/2005 | Saffari | |
| 2005/0193209 | A1 | 9/2005 | Saunders | |
| 2005/0250569 | A1 | 11/2005 | Kane | |
| 2006/0154727 | A1 | 7/2006 | Okuniewicz | |
| 2006/0205477 | A1 | 9/2006 | Fisk | |
| 2006/0205481 | A1 | 9/2006 | Dominelli | |
| 2006/0247035 | A1 | 11/2006 | Rowe | |
| 2007/0060237 | A1 | 3/2007 | Rowe | |
| 2007/0202941 | A1 | 8/2007 | Miltenberger | |
| 2007/0298873 | A1 | 12/2007 | Nguyen | |
| 2008/0150678 | A1 | 6/2008 | Giobbi | |
| 2009/0143128 | A1 | 6/2009 | Cautley | |
| 2010/0229108 | A1 | 9/2010 | Gerson | |
| 2011/0245943 | A1 | 10/2011 | Agarwal | |
| 2011/0287823 | A1 | 11/2011 | Guinn | |
| 2013/0130766 | A1 | 5/2013 | Harris | |
| 2014/0221071 | A1 | 8/2014 | Calio | |
| 2014/0256407 | A1 | 9/2014 | Graf | |
| 2014/0274277 | A1 | 9/2014 | Cuddy | |
| 2014/0357354 | A1 | 12/2014 | Gura | |
| 2015/0235507 | A1 | 8/2015 | Newton | |
| 2015/0302482 | A1 | 10/2015 | Vagner | |
| 2016/0335855 | A1 | 11/2016 | Ishibashi | |
| 2017/0270493 | A1 | 9/2017 | Lugli | |
| 2019/0220853 | A1 | 7/2019 | Srinivasan | |
| 2020/0051377 | A1 | 2/2020 | Montenegro | |
| 2020/0099694 | A1 | 3/2020 | Weiss | |
| 2020/0226885 | A1 | 7/2020 | Weaver | |
| 2020/0402353 | A1 | 12/2020 | Higgins | |
| 2021/0134104 | A1 | 5/2021 | Harris | |
| 2021/0233351 | A1 | 7/2021 | Meltzer | |
| 2022/0032168 | A1 | 2/2022 | Gupta | |
| 2022/0036692 | A1 | 2/2022 | Gupta | |
| 2022/0270434 | A1 | 8/2022 | Welch | |

OTHER PUBLICATIONS

Office Action (Non-Final Rejection) dated Dec. 8, 2022 for U.S. Appl. No. 17/443,738 (pp. 1-19).

Office Action (Notice of Allowance and Fees Due (PTOL-85)) dated Dec. 27, 2022 for U.S. Appl. No. 17/491,200 (pp. 1-13).

Office Action (Notice of Allowance and Fees Due (PTOL-85)) dated Jan. 19, 2023 for U.S. Appl. No. 17/491,200 (pp. 1-2).

Office Action (Non-Final Rejection) dated Feb. 21, 2023 for U.S. Appl. No. 17/491,291 (pp. 1-24).

Office Action (Notice of Allowance and Fees Due (PTOL-85)) dated Apr. 13, 2023 for U.S. Appl. No. 17/491,200 (pp. 1-7).

Notice of Allowance dated Apr. 13, 2023 for U.S. Appl. No. 17/491,200 (pp. 1-7).

Office Action (Non-Final Rejection) dated Jun. 14, 2023 for U.S. Appl. No. 17/491,528 (pp. 1-9).

Office Action (Non-Final Rejection) dated Mar. 15, 2023 for U.S. Appl. No. 17/491,523 (pp. 1-29).

Office Action (Final Rejection) dated Apr. 20, 2023 for U.S. Appl. No. 17/443,738 (pp. 1-13).

Office Action (Notice of Allowance and Fees Due (PTOL-85)) dated Jun. 23, 2023 for U.S. Appl. No. 17/809,844 (pp. 1-9).

Office Action (Final Rejection) dated Jul. 27, 2023 for U.S. Appl. No. 17/491,291 (pp. 1-31).

Office Action (Non-Final Rejection) dated Sep. 7, 2023 for U.S. Appl. No. 17/443,738 (pp. 1-14).

Office Action (Final Rejection) dated Sep. 22, 2023 for U.S. Appl. No. 17/491,523 (pp. 1-37).

* cited by examiner

MOBILE GAMING SYSTEM FOR REMOTE GAME PLAY

CROSS-REFERENCE TO RELATED APPLICATIONS

This application claims the benefit of priority to U.S. Provisional Patent Application No. 63/058,128, filed 29 Jul. 2020, entitled "ELECTRONIC GAMING MACHINE REMOTE GAME PLAY SYSTEM," and to U.S. Provisional Patent Application No. 63/112,400, filed 11 Nov. 2020, entitled "RANDOM BASED GAME OUTCOMES FOR REMOTE GAME PLAY," the entire contents and disclosures of which are hereby incorporated herein by reference in their entirety.

TECHNICAL FIELD

The disclosure relates generally to the field of electronic gaming devices, gaming systems, and transferring funds within a regulated gaming environment. More particularly, but not by way of limitation, this disclosure relates to presenting and implementing random based game outcomes for remote game play within a regulated gaming environment.

BACKGROUND

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

Typical games use a random number generator (RNG) to randomly determine the outcomes for the games (also referenced throughout the disclosure as a "random based game outcome"). Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Certain venues may also include systems that provide additional functionality alongside EGMs. For example, player tracking systems offer a venue to track a player's play and provide additional rewards to players based on factors, such as the amount the player wagers or how frequently they wager. Player tracking systems can also provide support for a user to establish an account and transfer credits to the gaming machine and back to the player account. After a player enters a player tracking card, a player tracking device connected to or embedded within the EGM communicates with the player tracking system to obtain, manage, and/or track player information.

EGMs often depend on usability and player tracking information to enhance player experiences. Although previous EGMs and player tracking systems include various features that improve usability and enhance player experiences, there is a continuous need for further improvements to electronic gaming devices, gaming systems, and/or the overall gaming environment (e.g., land-based and digital gaming ecosystems) while complying with gaming regulations.

SUMMARY

In one implementation, a mobile support system for providing wagering game play to a plurality of mobile devices is provided. The mobile support system includes a memory storing ball call information generated for an instance of a bingo game and a pay table associated with a bingo-based wagering game. The mobile support system also includes at least one processor. The mobile support system further includes a first game source server component, executed by the at least one processor, configured to generate and store, in the memory, the ball call information for the instance of the bingo game. The mobile support system also includes a first game source adapter component, executed by the at least one processor, configured to register a first mobile device with the first game source server, causing the first game source server component to transmit the ball call information for the instance of the bingo game to the first game source adapter component; The mobile support system further includes a resolution platform, executed by the at least one processor, configured to: (a) receive a play request associated with the first mobile device, the play request including a wager amount and representing placement of a wager for an instance of game play; (b) identify a bingo card for the instance of game play; (c) receive current ball call data from the first game source adapter component; (d) determine an outcome of the instance of game play by evaluating the bingo card based on the current ball call data and the pay table, the outcome identifying an award amount associated with the instance of game play; and (e) transmitting an outcome message to a game host server, the outcome message causes the award amount to be awarded during display of the instance of game play on the first mobile device.

In another implementation, a computer-implemented method for providing wagering game play to a plurality of mobile devices is provided. The method includes executing a first game source server and a first game source adapter paired with the first game source server. The first game source server is configured to generate ball call information associated with an instance of a bingo game. The method also includes executing a resolution platform that is configured to: (a) assign a first mobile device with the first game source adapter, thereby causing the first game source adapter to receive ball call information from the first game source server; (b) receive the ball call information for the instance of the bingo game; (c) generate a bingo card for a play request received from the first mobile device; (d) evaluate the bingo card based on the ball call information and a pay table that identifies winning patterns associated with the wagering game; (e) determine an outcome of the play request based on the evaluation of the bingo card; and (f) transmit the outcome of the play request for delivery to the first mobile device.

In still another implementation, a non-transitory computer-readable medium, readable by at least one processor and including instructions stored thereon is provided. When executed, the instructions cause the at least one processor to: (a) initialize a first game source server and a first game source adapter paired with the first game source server, the first game source server is configured to generate ball call information associated with an instance of a bingo game, the first game source adapter is configured to act as a proxy for a plurality of mobile devices with the first game source server; (b) assign a first mobile device with the first game source adapter, thereby causing the first game source adapter to receive ball call information from the first game source server; (c) receive the ball call information for the instance of the bingo game; (d) select, from a pool of randomly generated bingo cards, a bingo card for a play request received from the first mobile device; (e) evaluate the bingo card based on the ball call information and a pay table that identifies winning patterns associated with the wagering game; (f) determine an outcome of the play request based on the evaluation of the bingo card; and (g) transmit the outcome of the play request for delivery to the first mobile device.

In yet another implementation, a mobile support system for providing wagering game play to a plurality of mobile devices is provided. The mobile support system includes a memory storing game source data that is used to evaluate game outcomes for a wagering game. The mobile system also includes at least one processor executing instructions that, when executed, cause the at least one processor to: (a) receive a play request for the wagering game and associated with a first mobile device, the play request includes a wager amount and represents placement of a wager for an instance of game play of the wagering game; (b) generate an instance of game source data for the wagering game; (c) identify a game play data set used for the play request; (d) prior to performing a withdrawal transaction of the wager amount for the play request, generate a wager outcome for the play request by comparing the game source data with the game play data set; and (e) after determining the wager outcome for the play request, cause the withdrawal transaction of the wager amount for the play request to be performed, thereby completing a placement of the wager amount for the play request.

In still another implementation, a computer-implemented method for providing wagering game play to a plurality of mobile devices is provided. The method includes receiving a play request for a wagering game from a first mobile device. The play request includes a wager amount and represents placement of a wager for an instance of game play of the wagering game. The method also includes generating an instance of game source data for the wagering game. The game source data is used to identify wager outcomes for a plurality of play requests from a plurality of mobile devices. The method further includes identifying a game play data set used for the play request. The method also includes generating a wager outcome for the play request by comparing the game source data with the game play data set. The method further includes, after determining the wager outcome for the play request, performing a withdrawal transaction of the wager amount for the play request from a funds source account identified in the play request.

In yet another implementation, a non-transitory computer-readable medium, readable by at least one processor and comprising instructions stored thereon is provided. When executed, the instructions cause the at least one processor to: (a) receive a play request for a wagering game from a first mobile device, the play request represents initiation of an instance of game play of the wagering game; (b) receive, from a game source server asynchronously providing a bingo ball call independent of device participation in the wagering game, an instance of a bingo ball call that is used to identify wager outcomes for a plurality of play requests from a plurality of gaming devices; (c) generate a bingo ticket for the play request; (d) determine a wager outcome for the play request by comparing the bingo ball call with the bingo ticket; and (e) after determining the wager outcome for the play request, performing a withdrawal transaction of a wager amount from a funds source account of the mobile device and a deposit transaction of a win amount when the wager outcome results in a winning outcome.

In one implementation, a system comprises memory and a processor operable to interact with the memory. The processor receives game initiation instructions from a remote gaming device and generates, based on a random number generator, one or more bingo cards based on receiving the game initiation instructions. The processor sends instructions to participate in one or more multiplayer bingo games based on the game initiation instructions and receives a ball call from a bingo server based on the one or more multiplayer bingo games. The processor evaluates the ball call with the one or more bingo cards and determines a payout amount based on the evaluation of the ball call and the one or more bingo cards and sends presentation information, related presentation information, or both to the remote gaming device based on the payout amount.

In another implementation, a system comprises memory and a processor operable to interact with the memory. The processor scans a prepaid gaming voucher, wherein the prepaid gaming voucher was purchased prior to establishing a game session with a remote game play system. The processor establishes the game session with the remote game play system and transfers the scanned prepaid gaming voucher to the remote game play system. The processor receives balance information for the scanned prepaid gaming voucher and initiates a game instance using the credits from the prepaid gaming voucher for remote game play.

In yet another implementation, a remote game play system for providing remote game play tokens within a network of participating devices is provided. The remote game play system includes a token issuing device configured to receive, via a bill validator of the token issuing device, currency to establish a credit balance on the token issuing device. The token issuing device is also configured to receive an input requesting issuance of a remote game play token and to send, via a network, the request for issuance of a remote game play token and the amount of the credit balance to a remote game play server. The remote game play server is configured to, in response to receiving the request to issue a remote game play token, create a remote game play token transaction comprising remote game play token identification information and an amount of remote game play credit. The remote game play system further configured to issue, by a ticket printer of the token issuing device, a remote game play token.

In still another implementation, a remote game play system for redeeming remote game play tokens within a network of participating devices is provided. The remote game play system includes a token redeeming device configured to receive, via a ticket reader of the redeeming device, a remote game play token and to send, via a network, token identifying information of the received remote game play token to a remote game play server. The remote game play server, upon receiving the token identifying information, configured to validate the remote game play token and, upon validation, configured to receive from a remote game play database a credit amount of the token and to transmit, via a network, the amount of remote game play token credit to the redeeming device. The remote game play system further configured, via the token redeeming device, to issue an amount of currency corresponding to the amount of remote game play token credit.

In still another implementation, a remote game play system for obtaining an on-premise casino EGM game outcome for presentation on a remote game play device is provided. The remote game play system configured to send, via a network, remote game play token identification information from the remote game play device to a remote game play server of the remote game play system. The remote game play server, upon receiving the token identification information, configured to validate the token and to send, following validation of the token, the amount of token credit and a listing of on-premise casino EGMs available for remote game play to the remote game play device.

In one or more implementations, each of the above described methods, systems, and variations thereof, may be implemented as a series of computer executable instructions executed on a programmable electronic device. Such instructions may use any one or more convenient programming language. Such instructions may be collected into engines and/or programs and stored in any computer-readable medium or media that is readable and executable by a computer system, gaming device, or other programmable electronic device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirting and scope of the invention as defined by the claims. In the drawings, which are not to scale, the same reference numerals are used throughout the description and in the drawing figures for components and elements having the same structure. If applicable, primed reference numerals are used for components and elements having similar function and construction to those components and elements having the same unprimed reference numerals.

DETAILED DESCRIPTION

Figure 1:
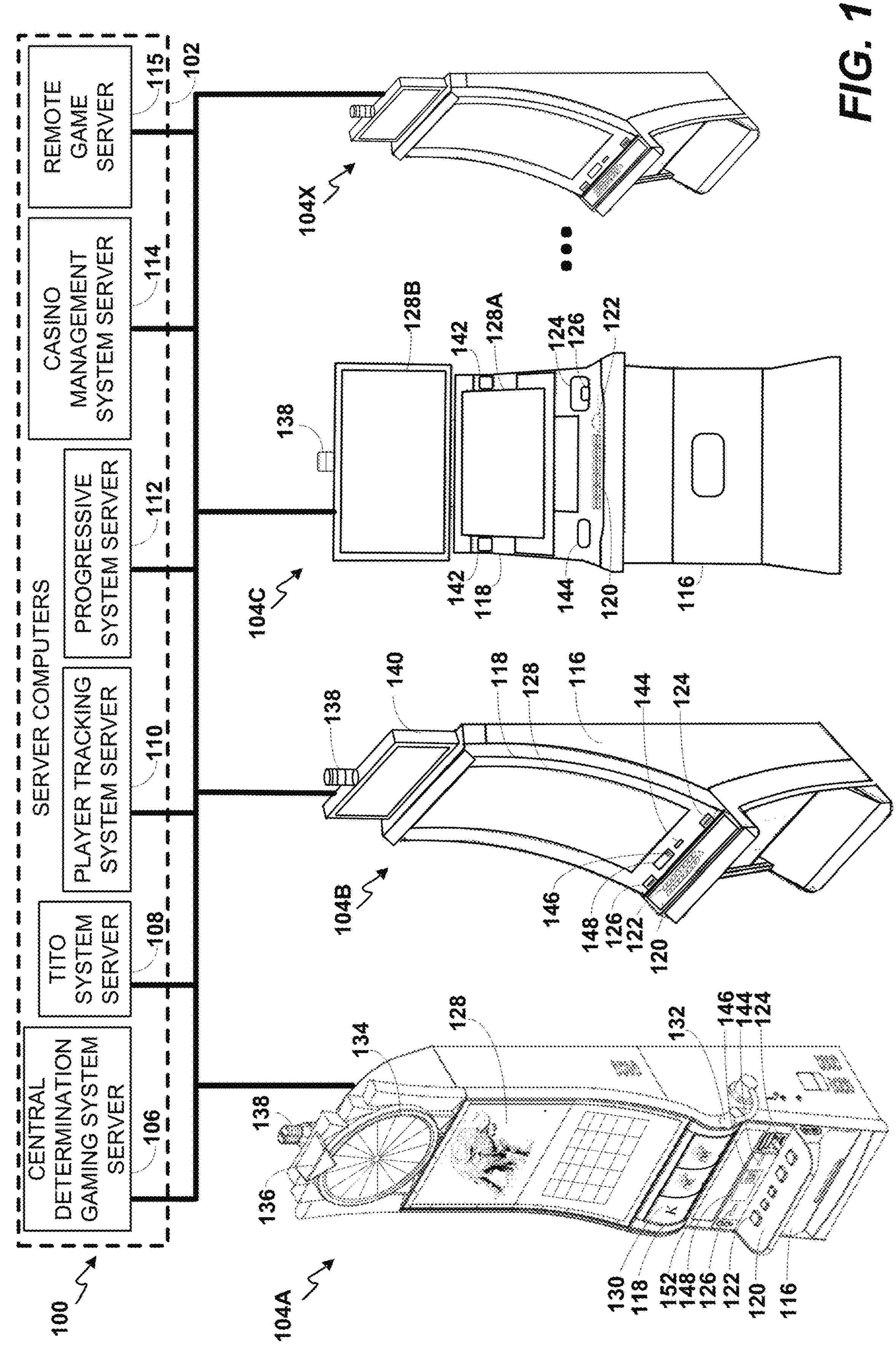
FIG. 1 is an exemplary diagram showing several EGMs networked with various gaming related servers.

The disclosure includes various implementations that present and generate random based game outcomes (e.g., bingo game outcomes, predetermined game outcomes, and/or lottery game outcomes) for mobile game play (e.g., mobile devices locally connected at gaming venues or remotely via online play). In an exemplary embodiment, a mobile gaming system ("MGS") supports, for example, game play on mobile gaming devices that utilizes random based game outcomes generated external to the gaming device (e.g., by server-side components). Some components of the mobile gaming system can be physically located in a designated gaming zones ("gaming venues") and/or other zones defined for wagering game play. The MGS is configured to provide mobile game play for one or more mobile gaming devices (e.g., a smartphone, tablet device, or the like). The MGS may provide instances of virtual gaming services, where each virtual gaming service represents a virtual version of a gaming device typically located on a casino floor (e.g., Class II bingo-based EGM, video lottery terminal, electronic scratch-off ticket terminal, or the like).

In some embodiments, the MGS provides a scalable support infrastructure for providing Class II bingo-based electronic gaming with a display façade (e.g., a slot-based façade) for mobile gaming devices and mobile players. The MGS executes an instance of a game source server component that provides transient game data during a round of game play, such as a Class II bingo ball call as conventionally provided for dedicated land-based EGMs. The MGS also pairs each instance of a game source server with a game source adapter. The game source adapter (or just "adapter") acts as a proxy device for multiple mobile gaming devices participating in this instance of the game, for example, simulating registration and participation in a game instance provided by the game source server (e.g., pretending that each mobile device is an EGM). Since the game source server component(s) may have operational limits to the number of participating gaming devices (e.g., a maximum number of supported devices), the MGS provides scalability to support the dynamic nature of mobile gaming by allowing new server/adapter pairs to be instantiated and terminated as mobile devices come and go. The MGS also executes a resolution platform that, for a given spin on a mobile device, receives game source data from the server/adapter pair and evaluates that game source data against, for example, a generated bingo card and Class II pay table (e.g., performing outcome evaluation with bingo pattern matching).

The MGS may also perform wagering transactions (e.g., bet withdrawals, win credits) for each spin initiated by a mobile player (e.g., performing digital wallet transactions with a third party digital wallet provider and funds account supporting mobile game play). In an example embodiment, the MGS performs an outcome resolution for a particular spin prior to performing wagering transactions for that spin (e.g., prior to performing a withdrawal transaction for a given wager amount for that spin). For example, when a spin is first initiated by the mobile player, the MGS performs a spin outcome process (e.g., via the resolution platform and adapter/server pair) to determine an outcome of that spin prior to submitting the bet transaction. Once an outcome has been determined, the MGS may perform a bet transaction to ensure that the mobile player has funds to cover the wager amount and deduct the wager amount from the funds source. Upon successful completion of the bet transaction, if the spin outcome resulted in a win, the MGS may also perform a win transaction to credit a win amount into the funds source of the mobile player. Performance of the game outcome prior to transaction processing may provide additional benefits over a "bet first" approach, in that an outcome is determined and ensured before the bet transaction is performed. If, for example, a bet transaction were performed first and then an error occurred during outcome determination (e.g., a support server device goes offline or errors in communication, a critical process terminates), that bet transaction would need to be refunded. With this "outcome first" approach, if an error occurs during outcome determination, no bet transaction needs to be reversed.

In some embodiments, in a Class II implementation, following a remote gaming device establishing a gaming session with the remote game system and initiating a game instance (e.g., pressing a spin button), the allocated virtual gaming service joins a multiplayer game (e.g., an electronic bingo game). The remote game system can include or is coupled to a central determination gaming system (e.g., a bingo server) that initiates one or more sequence listings (e.g., bingo or lottery ball calls). After joining the multiplayer game, the virtual gaming service compares a given sequence listing (e.g., a bingo number listing) with a selected pattern and/or sequence of symbols and/or numbers (e.g., a bingo card) to possibly determine one or more designated game patterns (e.g., bingo patterns). Afterwards, the virtual gaming service evaluates the designated game patterns according to one or more pay tables to determine one or more game outcomes (e.g., payout of 100 game credits). The virtual game service then determines and sends presentation information corresponding to the game outcomes to the remote gaming device. In one example, the virtual gaming services can directly dictate and provide the presentation game outcomes to the remote gaming device. In another example, the virtual gaming services indirectly communicates the presentation game outcomes by providing presentation related information (e.g., one or more RNG seeds or credit values) to the remote gaming device for it to derive the presentation game outcomes.

The disclosure also includes various implementations to fund real money wagering for remote game play. In one example, remote game play can be funded with a prepaid game voucher (e.g., a TITO ticket), which can also be referenced as a "prepaid game token," "pre-purchased remote game play token" or more generally as a "token" throughout this disclosure. The prepaid game voucher can be a physical and/or digital voucher that a player purchases within a designated gaming zone and/or other wager-enabled zones prior to remote game play. For a physical, prepaid game voucher, a remote gaming device scans the prepaid game voucher and stores information related to and/or a scanned digital image of the prepaid game voucher. The remote gaming device forwards related information and/or the scanned prepaid game voucher to a voucher system for funding verification. After verifying the prepaid game voucher, the voucher system sends a verified voucher value to the virtual gaming services to use for game play. The remote gaming device presents via a user interface (UI) on a mobile application the credit balance loaded onto one or more credit meters and other funding information. In another example, rather than utilizing a prepaid game voucher, the remote gaming device may initiate the transfer of funds to and from a player's wagering account that includes one or more digital wallets. As an example, a digital gaming wallet linked to a player's wagering account may be customized to facilitate and manage gaming related transactions, such as transferring funds to the virtual gaming service to load onto credit meters.

In some embodiments, a remote electronic gaming machine (EGM) game play system is provided allowing a player to purchase a token, e.g., a ticket, which enables the player to use a mobile device to link to and remotely play an on-premise casino EGM. The system is comprised of, e.g., a network, a remote game play server, one or more on-premise casino EGMs, a token purchase kiosk, a mobile device, and a remote play mobile application. The player, in exchange for funds deposited or otherwise transferred to the kiosk, may receive a token from the kiosk, e.g. via a ticket output from a kiosk ticket printer, for future remote play of an on-premise casino EGM. The player, using the mobile application on their mobile device, may scan or otherwise enter token identifying information into the mobile application which is communicated via the network to the remote game play server for validation. The server, upon successful validation of the token identifying information, responds to the mobile application with credit balance information and one or more on-premise casino EGMs that are available for remote play. The mobile application may then, via a user interface of the mobile application, display the credit balance information on one or more credit meters and display, for selection by the player, a menu of the on-premise casino EGMs. The player may then select an EGM for remote play, which is communicated form the mobile application to the remote play server. The remote play server, following receipt of the selected on-premise EGM, establishes a communication link between the mobile application and the selected on-premise casino EGM, enabling remote play of the EGM via a game play user interface.

In terms of technical effects, the one or more remote game play implementations described throughout the disclosure deliver improvements to gaming systems and/or overall gaming environment by providing new and/or improved gaming device and/or system operations that comply with gaming regulations. Specifically, a remote gaming device is specially programmed to present game outcomes inside and/or outside typical gaming zones by decoupling the presentation of game outcomes with the generation of random-based game outcomes. The remote gaming device offloads the generation and/or evaluation of random based game outcomes to a remote game play system to avoid being classified as a wagering game device restricted to a designated gaming zone. The remote game play system, which could be located within a designated gaming zone, includes virtual gaming services that perform functionality associated with wagering gaming devices. To simplify integration within existing game system components, the remote game play system can act as middleware system that interfaces and communicates with a central determination game system (e.g., bingo server), a casino management system, and/or other existing gaming and casino systems. The remote game play system also supports multiple funding options for remote gameplay that comply with one or more jurisdictional regulations. These and other technical features are described in greater detail later in the disclosure.

FIG. 1 illustrates several different models of EGMs that could be specially configured to generate random based game outcomes using one or more symbol frame mechanic. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers. Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein. The server computers 102 may include a central determination gaming system server 106, a ticket-in-ticket-out (TITO) system server 108, a player tracking system server 110, a progressive system server 112, a casino management system server 114, and/or a remote game play server 115. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of terminals, gaming devices 104A-104X, and/or other types of gaming devices (e.g., remote gaming devices) that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies. Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
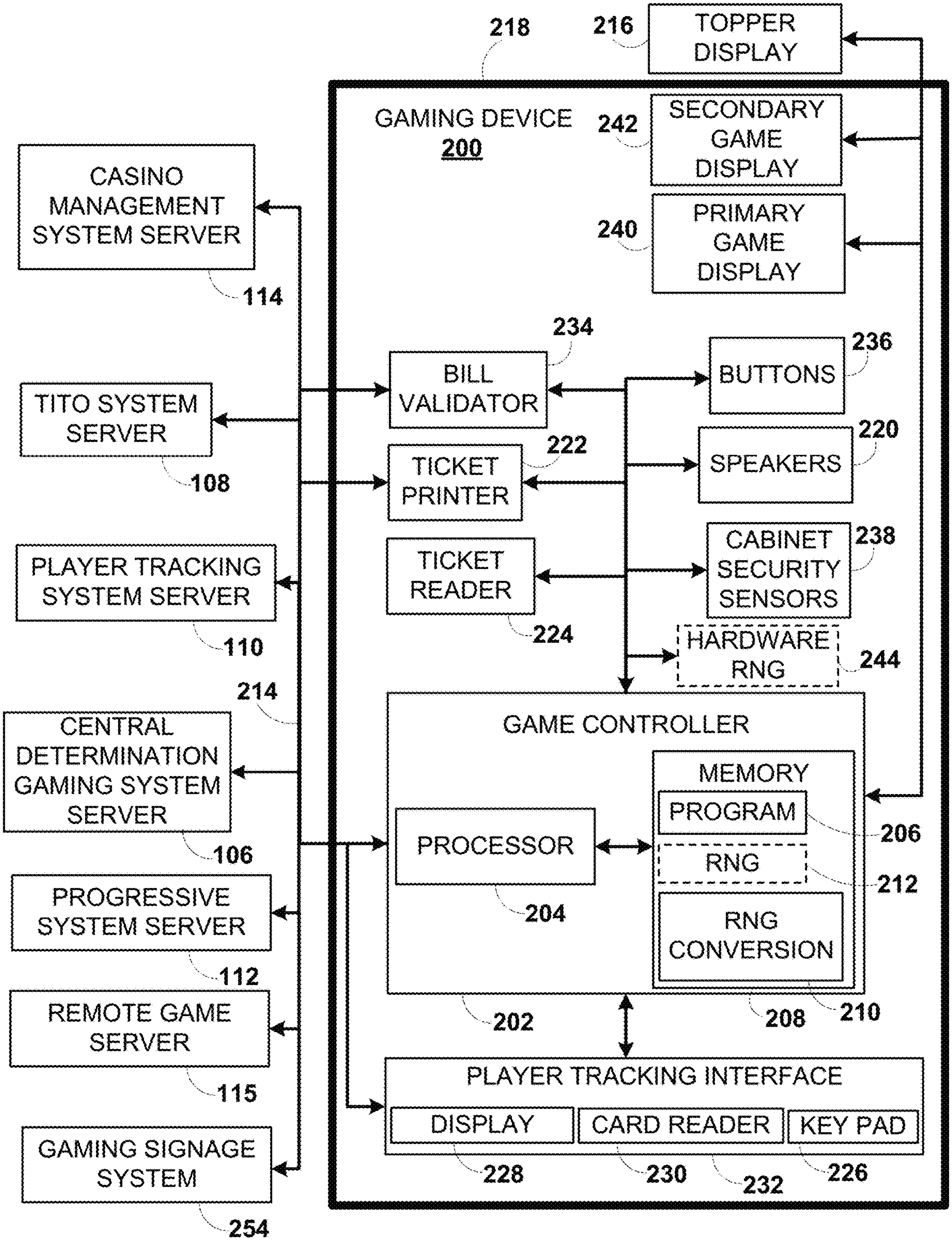
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies. Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies. Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more backend gaming systems, such as a central determination gaming system server 106. For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies. Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing the present disclosure, such as remote gaming devices, necessarily include top wheels, top boxes, information panels, cashless ticket systems, player tracking systems and/or an RNG. Specifically, one implementation of a remote gaming device may include processor 204, program 206, memory 208, primary game display 240, and speakers 220. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
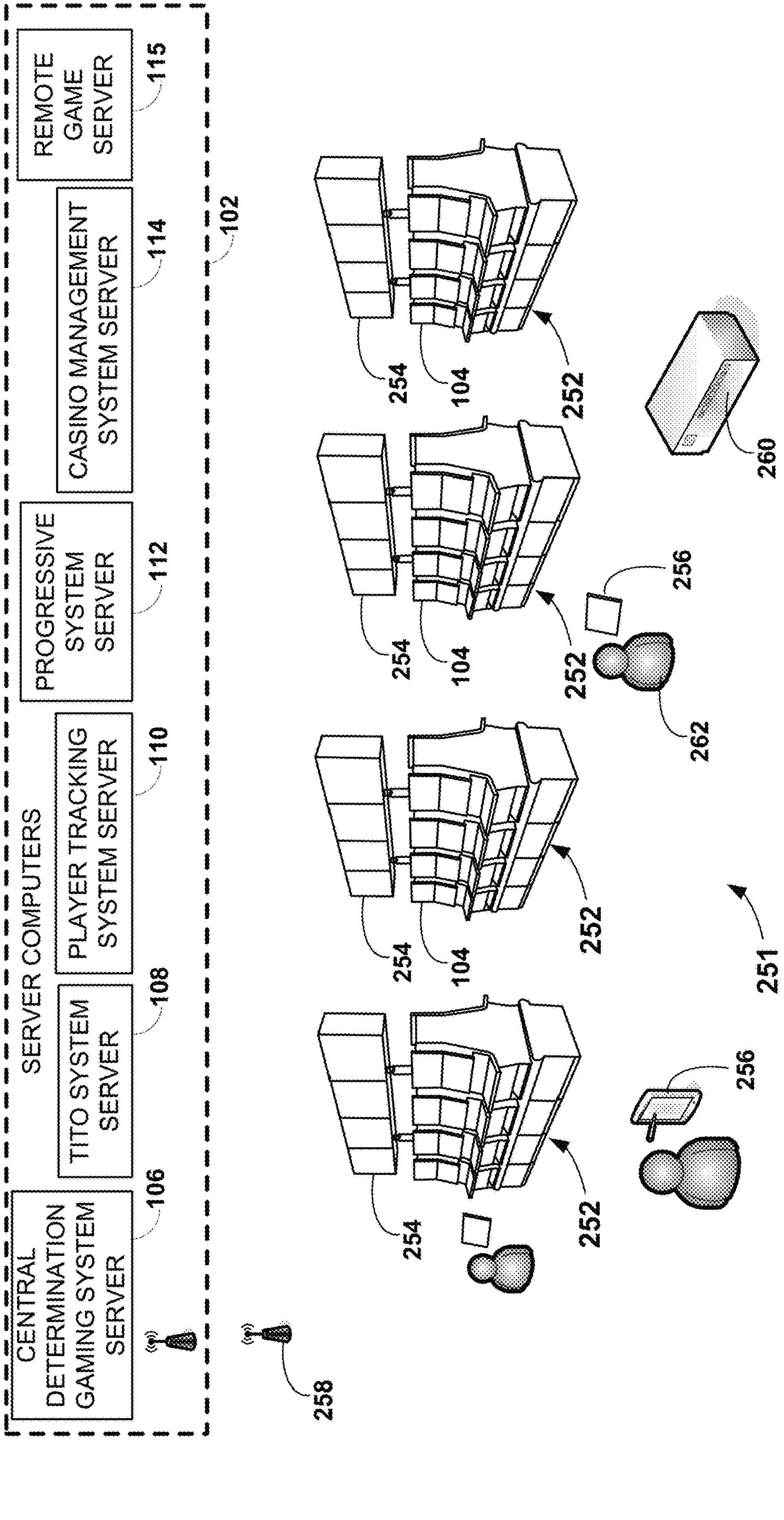
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may include tablet devices, cellular phones, smart phones, dedicated gaming consoles, and/or other handheld or portable devices. In this example, the mobile gaming devices 256 can be remote gaming devices configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, remote game server 115, and/or one of the EGMs 104 located on a casino floor. Some mobile gaming devices 256 may be configured to accept monetary credits from a credit or debit card, via a wireless interface (e.g., via a wireless payment app), via scanned checks and/or vouchers (e.g., prepaid game vouchers or TITO tickets), via a patron casino account (e.g., digital wallet), etc. As an example, to accept monetary credits, some mobile gaming devices 256 may include a camera, scanner, and/or ticket reader. In some implementations, the mobile gaming device 256 could include or be connected to a ticket printer to generate physical vouchers that can be used at EGMs 104.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via vouchers (e.g., prepaid game vouchers and TITO tickets), etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link.

In some such examples, when a casino patron 262 is ready to cash out, the casino patron 262 may select a cash out option provided by a mobile gaming device 256, which may include a real button or a virtual button (e.g., a button provided via a graphical UI (UI)) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
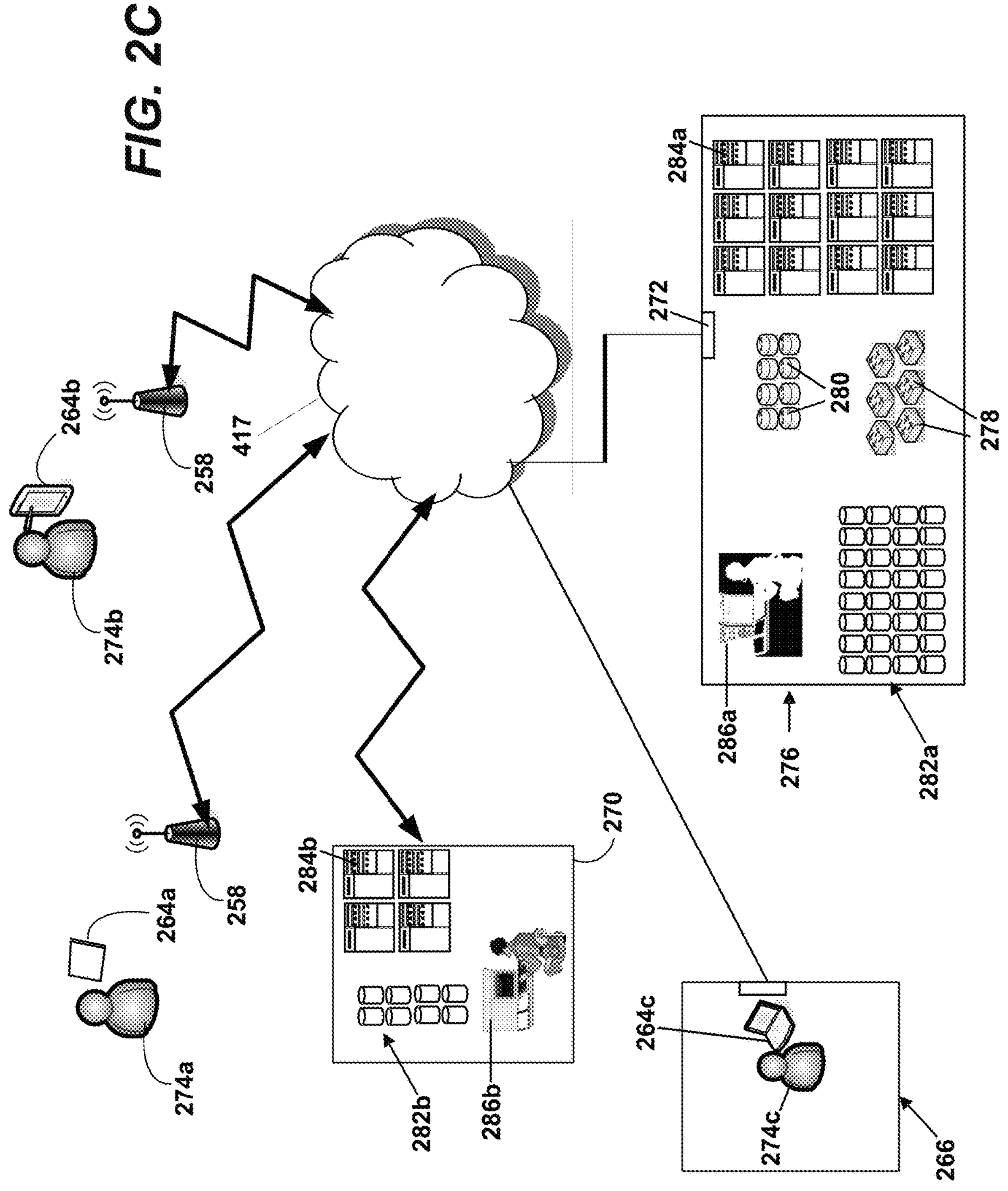
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c*, which can also be referenced throughout the disclosure as "remote gaming devices," are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 570*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Example Game Processing Architecture

Figure 3:
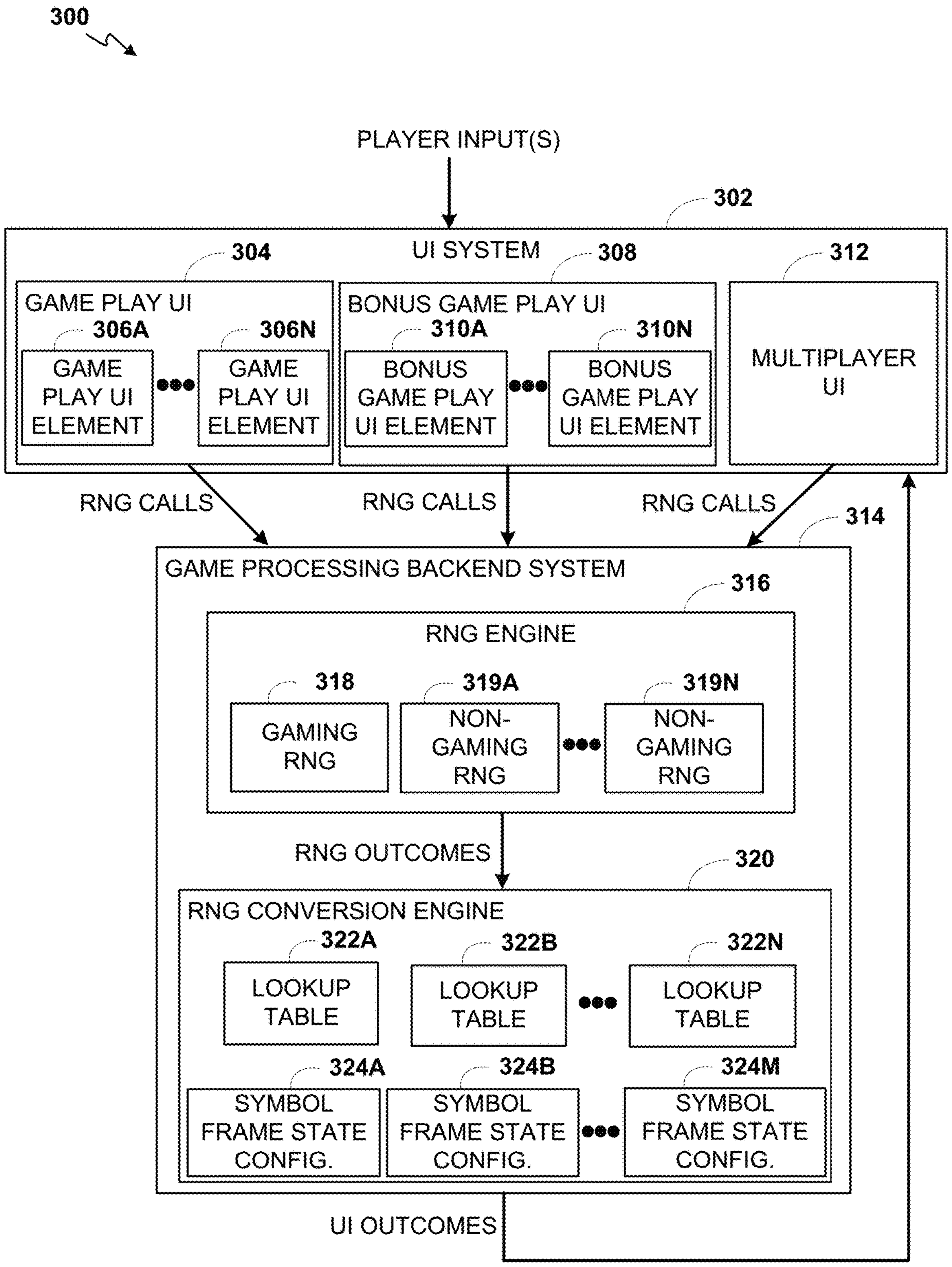
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG and/or game initiation calls to a game processing backend system 314. Game processing backend system 314 then processes the RNG and/or game initiation calls with RNG engine 316 to generate one or more RNG outcomes, for example random numbers or a sequence listing. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a remote gaming device and one or more backend gaming systems, such as central determination gaming system server 106 and/or remote game server 115 shown in FIG. 1.

The UI system 302 includes one or more UIs that a player can interact with. Using FIG. 3 as an example, the UI system 302 includes one or more game play UIs 304, one or more bonus game play UIs 308, and one or more multiplayer UIs 312, where each UI type includes one or more mechanical UIs and/or GUIs. In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 or bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG and/or game initiation calls to a game processing backend system 314. As an example, the UI system 302 could use one or more application programming interfaces (APIs) to generate the RNG and/or game initiation calls. To process the RNG and/or game initiation calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300. In one or more implementations, instead of sending the UI outcome back to the UI system 302, the game processing backend system 314 can send information related to the UI outcome (e.g., RNG seed, the number of spins, payout amount) to the UI system 302. After receiving information related to the UI outcome, the UI system 302 may derive and determine how to present the UI outcome.

Figure 4:
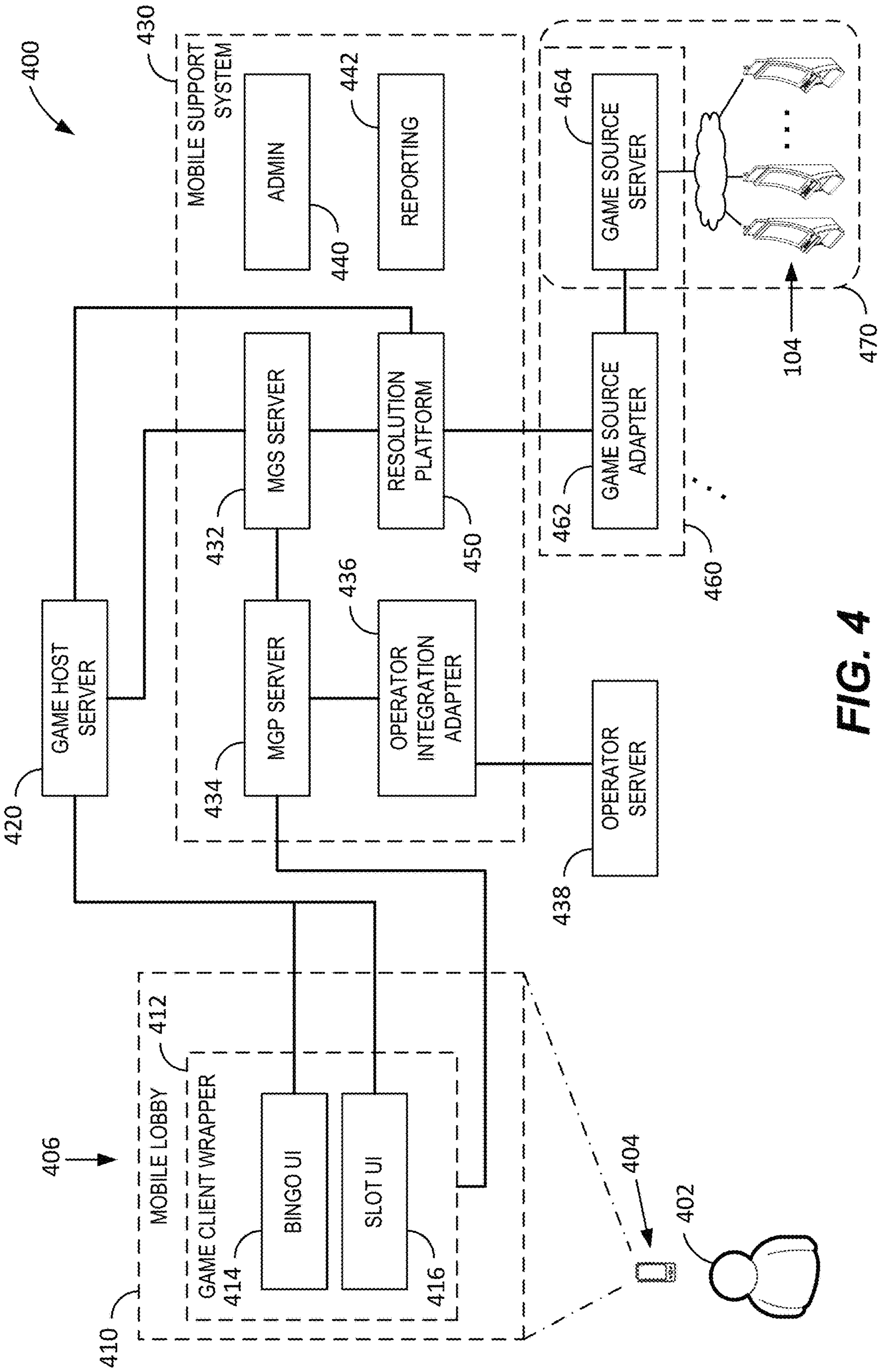
FIG. 4 is a component diagram and architecture illustrating an example mobile gaming system (MGS) and various supporting components.

FIG. 4 is a component diagram and architecture illustrating an example mobile gaming system (MGS) 400 and various supporting components. In the example embodiment, the MGS 400 provides mobile game play (e.g., wager-based gaming) for mobile devices of players, such as a mobile device 404 of mobile player 402. The mobile game play supported by the MGS 400 may be, for example, "onsite" or "in-person" gaming (e.g., wager gaming at a designated gaming venue, such as a casino), or may be "remote" or "online" gaming (e.g., wager gaming provided via the Internet and not necessarily at a designated gaming venue). Mobile device 404 may be similar to the mobile gaming devices 256 shown in FIG. 2B, or end user devices 264 shown in FIG. 2C. In other embodiments, a personal computing device of the player 402 may act as the mobile device 404 described herein (e.g., a desktop computing device remote used by the player 402 and used for online game play). The mobile device 404 executes various software components of a "player app" 406 that integrate with other components of the MGS 400 to provide the game play experience. The player app includes a main lobby 410 that provides a user interface (UI) for the player 402 to, for example, navigate a suite of available games and select a mobile game for play. The mobile game, in one example embodiment, is a Class II bingo-based wagering game that provides a game client wrapper 412 that displays both a bingo UI 414 (e.g., showing bingo card(s) and ball calls provided during each wagering instance) and a slot UI 416 (e.g., providing a spinning reel, slot-based façade emulating the bingo outcomes from the bingo cards) to the player 402 during game play.

In the example embodiment, the mobile device 404 interfaces with a game host server 420 that facilitates some interactions and game play steps between the mobile device 404 and a mobile support system 430. The game host server 420 may provide a game development kit (GDK) and game platform for development and administration of a suite of mobile games provided to the mobile devices 404. The mobile support system 430 provides back-end support components (e.g., server systems executing software components) that facilitate various aspects of wager gaming for the game host server 420 and the various participating mobile devices 404. A mobile gaming system (MGS) server 432 is a game host service that acts as a primary gateway for interaction between the game host server 420 and the mobile support system 430. A mobile gaming platform (MGP) server is an aggregation service that can connect to multiple MGS servers 432 without impacting player account management (PAM) integration. Games may be served from the MGS server(s) 432 via the MGP server 434 or via direct PAM integration. An operator integration adapter 436 acts as an interface to an operator server 438, which performs transactions for wagering activities performed during game play (e.g., microtransactions, digital wallet-based transactions, or the like). The operator server 438 may be a third party server and may provide a digital wallet through which the player 402 may identify funds sources for wagering activity. The mobile support system 430 may also provide an admin component 440 and a reporting component 442 that provide various administrative and accounting functions to operators, game developers, or other parties associated with the MGS 400.

In the example embodiment, the MGS 400 provides a resolution platform 450 that works in conjunction with one or more pairs of game source components 460 to resolve instances of game play for the mobile devices 404 and to scale for a dynamically changing number of mobile devices 404. For each pair of game source components (or "adapter/server pair") 460, a game source server 464 generates game source data (e.g., a bingo ball call for an ongoing round of bingo) and a game source adapter 462 is provided to facilitate entry of a set of mobile devices 404 into a particular game (e.g., into one particular ball call being provided by the game source server 464). For example, the game source server 464 may provide a bingo ball call for an instance of bingo and may support up to a maximum number of participants (e.g., EGMs 104 and/or mobile devices 404) in any given bingo instance (e.g., a maximum of 250 devices 104, 404). During operation, when the game source server 464 originally initiates a new bingo instance, the game source server 464 may generate an initial ball call (e.g., a predetermined initial number of randomly determined bingo balls) and may subsequently continue to generate an ongoing ball call for that ongoing bingo instance (e.g., a new ball every 1.6 seconds until a game ending win is achieved, a maximum number of balls are drawn, or some other game ending condition is met).

In some embodiments, the game source server 464 may be configured to support a fixed, predetermined set of land-based devices (e.g., EGMs 104) in a conventional wagering venue 470. Such participation by EGMs 104 does not use the game source adapter 462 functionality to participate in the bingo instance, but instead communicates directly with the game source server 464 to acquire the ball call for the bingo instance provided by the game source server 464, and may perform wagering resolution activities using that ball call directly on the EGMs 104. For land-based EGMs 104, each EGM 104 is configured with a unique EGM ID. During setup, each land-based EGM 104 registers with a particular game source server 464 in a particular bingo game instance, pulls game configurations from the game source server 464, and starts listening to an IP multicast topic from the game source server 464 to enable game play on the EGM 104.

In the example embodiment, the game source adapter 462 facilitates participation by mobile devices 404 by emulating registration in the bingo instance of the game source server 464 individually for each mobile device 404 (e.g., perhaps up to the maximum number of devices supported by the game source server 464). During an initial setup of a new game source adapter 462 or a new game source adapter/server pair 460, the game source adapter 462 identifies a list of virtual EGM IDs (e.g., from a provisioned list of virtual EGM IDs provided by the resolution platform 450, from automatic generation of unique virtual EGM IDs performed by the resolution platform 450 or the game source adapter 462) and registers each virtual EGM ID with the game source server 464, emulating the setup for land-based EGMs 104 described above. The game source adapter 462 may register up to a maximum number of EGMs supported by the game source server 464 (e.g., up to 250 virtual EGMs). This setup causes the game source adapter 462 to begin receiving ball call data from the game source server 464 and thus allowing support for an additional mobile device per newly provisioned virtual EGM ID. In some embodiments, a particular game source server 464 may be configured to support some land-based EGMs 104 and may thus have capability to support some mobile devices 462. In such situations, the associated game source adapter 462 may be configured to register mobile devices 404 with virtual EGM IDs up to the maximum number of gaming devices supported by the server 464. For example, if n is the number of land-based EGMs currently supported by the particular game source server 464, the associated game source adapter 462 may be configured with max_supported_devices−n=num_mobile_devices number of mobile devices.

As mobile devices 404 begin game play for a bingo-based game, the mobile support system 430 may assign each particular mobile device 404 to a particular game source adapter 462, and thus to a particular game source server 464 (e.g., as each game source adapter 462 is in a one-to-one pairing with the game source server 464). In some embodiments, the resolution platform 450 is configured to assign a new mobile device 404 to a particular game source adapter 462, and thus to a given bingo instance, and each mobile device 404 may be assigned to a particular virtual EGM ID supported by the game source adapter 462. As the mobile player 402 plays each game play instance (e.g., each wager and spin), the resolution platform 450 receives the ball call from the assigned game source adapter 462 and game source server 464 for that bingo instance, randomly generates or selects a bingo card for the game play instance, and resolves the wager based on the bingo card and the ball call (e.g., comparing the ball call to predetermined winning patterns provided in a paytable). Upon successful determination of the outcome of the game play instance, the mobile support system 430 performs a wager transaction for the game play instance (e.g., decrementing a wager amount from a funds source of the player 402) and may perform an award transaction for the game play instance (e.g., if the outcome of the game play instance resulted in an award). An example game initiation process is described below with respect to FIG. 5. An example game play resolution process is described below with respect to FIG. 6.

Figure 5:
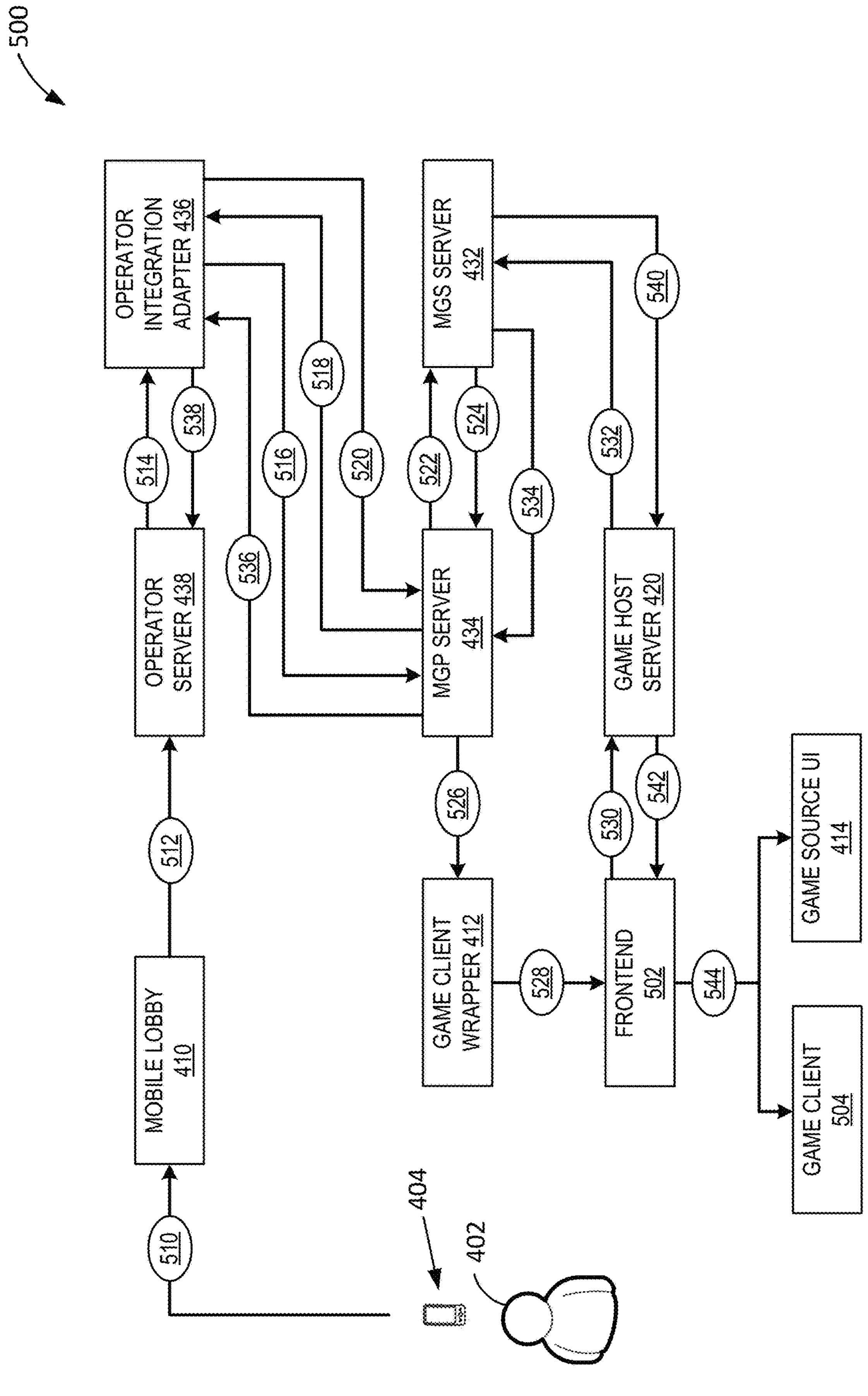
FIG. 5 is a flowchart and data flow diagram of an example process for initiating a game play session between the mobile device of the mobile player and the MGS shown in FIG. 4.

FIG. 5 is a flowchart and data flow diagram of an example process 500 for initiating a game play session between the mobile device 404 of the mobile player 402 and the MGS 400 shown in FIG. 4. In the example embodiment, at operation 510, the mobile player 402 launches a game on their mobile device 404 (e.g., within the mobile lobby 410). At operation 512, the mobile device 404 creates a game launch session with the operator server 438, which redirects the launch session request to a launch URL of the operator integration adapter 436 at operation 514 and through to a POP adapter login URL provided by the MGP server 434 at operation 516. At operation 518, authentication is performed for the mobile user 402, and session and balance information is provided at operation 520. At operation 522, the MGP server 434 performs an offline session call to MGS server 432. At operation 524, the MGS server 432 provides game configuration data to MGP server 434, which returns the game client wrapper 412 to the mobile device 404 at operation 526. The mobile device 404 loads a front end 502 at operation 528 and initializes the game with the game host server 420 at operation 530. The game host server 420 authenticates with the MGS server 432 at operation 532, which transmits balance data through to the MGP server 434 at operation 534, to operator integration adapter 436 at operation 536, and to operator server 438 at operation 538. The MGS server 432 also provides a balance response back to the game host server 420 at operation 540, which transmits game client details back to the front end 502 at operation 542. At operation 544, the mobile device 404 executes a game client 504, including the game source UI (e.g., bingo UI 414 and slot UI 416). After the process 500 is complete, the mobile device 404 is prepared to begin wagering and game play activities.

Figure 6:
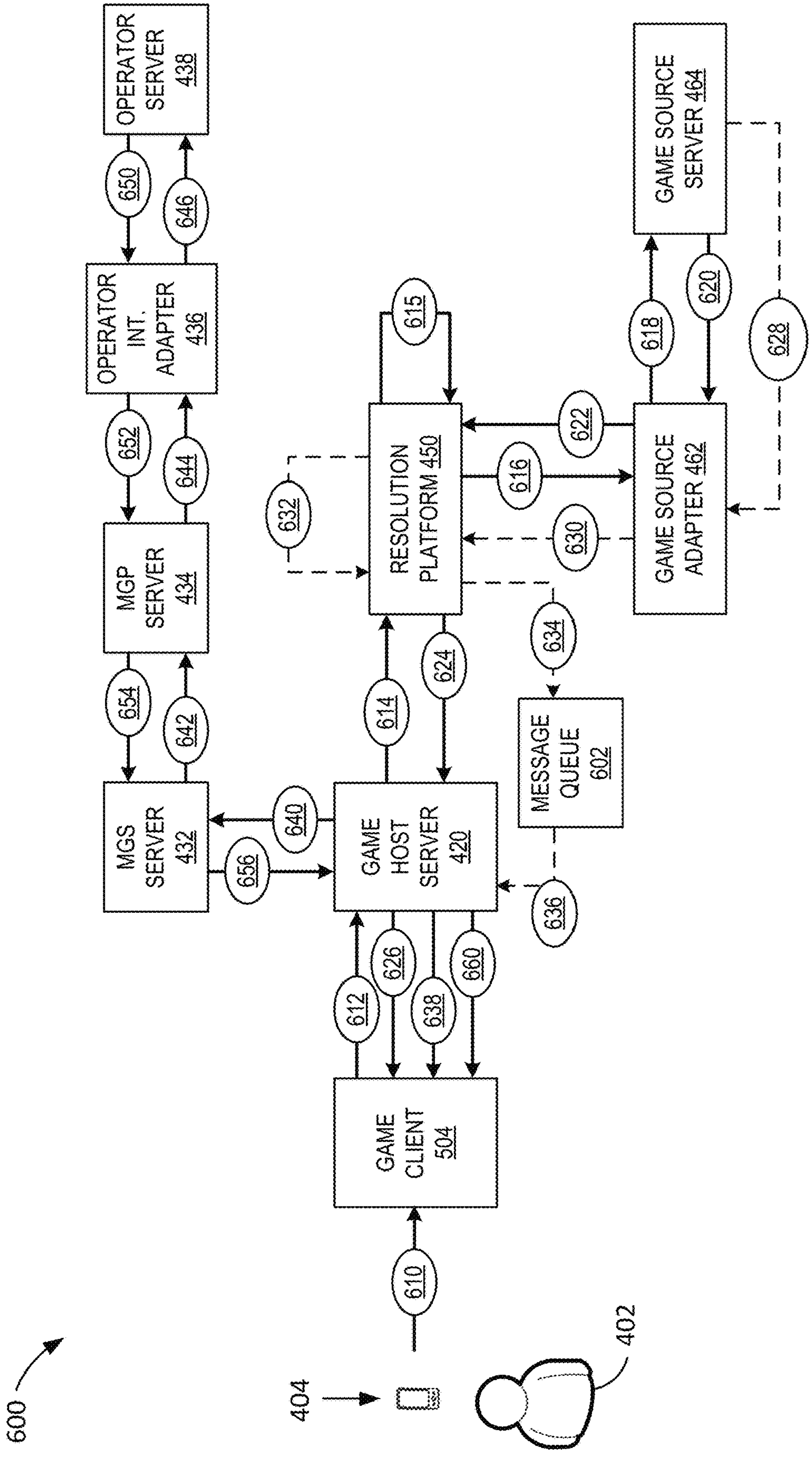
FIG. 6 is a flowchart and data flow diagram of an example process for game play resolution performed during a game play session between the mobile device of the mobile player and the MGS shown in FIG. 4.

FIG. 6 is a flowchart and data flow diagram of an example process 600 for game play resolution performed during a game play session between the mobile device 404 of the mobile player 402 and the MGS 400 shown in FIG. 4. In the example embodiment, the game play resolution process 600 is performed after the initialization process 500 shown in FIG. 5. At operation 610, the mobile player 402 initiates an instance of game play (e.g., selecting a wager amount and pressing a spin button through the slot UI 416 of the game client 504 executing on the mobile device 404. At operation 612, the mobile device 404 transmits a play request (e.g., a spin request) to the game host server 420 (e.g., via a websocket API), which in turn transmits a spin request through to the resolution platform 450 at operation 614. The spin request may include, for example, a session ID, a player ID, a game ID, a wager amount, and a denomination of the wager amount. At this stage, in the example embodiment, the game client 504 awaits further communication from the game host server 420 before initiating any game display features associated with this current game instance. For example, the game client 504 may not yet start reels spinning in the slot UI 416, but may display prior bingo cards and an ongoing ball call from prior spins in the bingo UI 414.

As discussed above, the resolution platform 450 acts to resolve game instances on behalf of the various mobile devices 404 participating in the MGS 400. In some embodiments, if the spin request received at operation 614 is from a mobile device 404 that is not yet assigned to a particular game source adapter 462 and game source server 464 adapter/server pair 460, then the resolution platform 450 may assign that mobile device 404 to a particular game source adapter 462 at operation 615 before proceeding with resolution of this spin request. For example, the resolution platform 450 may store and maintain a database of assignments (not shown) that, for each mobile device, identifies which particular game source adapters 462 and game source servers 464 that mobile device is assigned, and may additionally include which virtual EGM ID is assigned to each mobile device. As mobile devices 404 begin and end game play sessions, the resolution platform 450 may update this database to track these assignments. In some embodiments, game source adapters 462 may have a preconfigured maximum number of supported devices. As such, if there are no available spots on any existing game source adapters 462 (e.g., no available virtual EGM IDs for any of the adapter/server pairs 460), the resolution platform 450 may automatically initiate a new game source adapter 462 and game source server 464 pair 460 during operation 615, thereby starting a new bingo instance to which more mobile devices 404 can join. In another embodiment, capacity may be manually controlled by the admin component 440 providing an administrative user interface that allows administrators to manually provision adapter/server pairs 460. As described above with respect to FIG. 4, initiation of this adapter/server pair 460 may cause the new game source adapter 462 to register multiple new virtual EGM IDs with the game source server 464 and assign one of those new virtual EGM IDs to this new mobile device (e.g., a bulk initial registration approach), or may allow the new game source adapter 462 to register a single new virtual EGM ID with the game source server 464 in response to this new mobile device (e.g., an individual registration approach). Once the mobile device 404 has been assigned to a particular adapter/server pair 460, and thus to a particular virtual EGM ID, the resolution platform 450 is capable of processing spin requests for that mobile device 404.

To resolve a given spin request, the resolution platform 450 also generates, selects, or otherwise identifies a bingo card for this spin request at operation 615. In some embodiments, the resolution platform 450 may randomly generate the bingo card using RNG outputs. The resolution platform 450 also determines which game source adapter 462 is assigned to the mobile device 404 associated with this spin request during operation 615 and transmits a start game round message to that game source adapter 462 operation 616. The start of game round message may include, for example, the session ID, the game ID, the bingo card, a spin ID for this spin, the wager amount, and the denomination. At operation 618, the game source adapter 462 transmits a request to join play to the game source server 464 paired with the adapter 462. This request to join play may include the virtual EGM ID, the game ID, the bingo card, and the denomination. The game source server 464 provides a join game acknowledgement message back to the adapter 462 at operation 620, which may include a bingo game round ID. In some embodiments, the resolution platform 450 may generate, select, or otherwise identify a lottery ticket or a scratch-off card for this spin request at operation 615. The bingo cards, lottery tickets, and scratch-off cards generated for the spin request (or "play requests") may be referred to herein as game play data sets, representing game play data specific to a particular play request and that may be used to evaluate wager outcomes against game source data (e.g., bingo ball calls, lottery calls, or the like).

Upon the game source adapter 462 registering this mobile device 404 in the bingo instance provided by this game source server 464, the game source adapter 462 sends a game wait response back to the resolution platform 450 at operation 622, which may include the session ID, the EGM ID, the bingo card, the bingo game round ID, and a wait time. At operation 624, the resolution platform 450 sends a game wait response message back to the game host server 420, which may include the session ID, the EGM ID, the bingo card, and the wait time. At operation 626, the game host server 420 transmits a game wait response message back to the game client 504. In situations where a game wait time is received by the game client 504, this indicates that this game session is the only game session active on the particular adapter/server pair 460 and thus this particular spin processing must wait until another player has joined that adapter/server pair 460 (e.g., in jurisdictions where multiple players are required to participate in the bingo instance). When the wait time has elapsed, the player may respin to trigger another play attempt.

Once the mobile device 404 is registered and assigned to this particular bingo instance, the MGS 400 performs outcome resolution for this spin request. At operation 628, the game source server 464 transmits a game instance data message (e.g., ball call data) to the adapter 462, and the adapter 462 transmits a game instance data message to the resolution platform at operation 630. These game instance data messages may include, for example, the bingo round ID and the ball call data. The game source adapter 462 receives the ball call data from the server 464 as an IP multicast message, but may convert that data into another data format for consumption by the resolution platform 450. For example, the adapter 462 may convert the ball call information into a JSON format, and may use a standard communications protocol such as HTTP or HTTP/2. At operation 632, the resolution platform 450 may generate, select, or otherwise identify a bingo card for this particular spin request (e.g., if not already performed during operation 615) and performs a game outcome determination for this spin request using that bingo card and the current ball call data received from the adapter 462 for this bingo instance. For example, the resolution platform 450 may identify a particular pay table associated with the game being played by the player 402 on their game client 504 from a library of possible games (e.g., based on a unique game ID provided in the spin request). The resolution platform 450 may compare the current ball call with the identified bingo card to determine an outcome based on a wager amount provided with the spin request and based on the pay table associated with this particular game (e.g., comparing patterns in the pay table to the bingo card and ball call). When the bingo wager outcome includes a win, the resolution platform 450 also identifies a winning bingo pattern. Further, the resolution platform 450 may also identify a reel game outcome based on the determined bingo wager outcome (e.g., a spin façade and façade ID whose spin outcome evaluation equals, approximately equals, or is within a predetermined threshold of the bingo wager outcome). At operations 634 and 636, the resolution platform 450 transmits a game join message to the game host server 420 via a message queue 602. The game join message may include the current ball call information, the bingo card information (e.g., a 5×5 matrix of a bingo card), the session ID, the bingo round ID, and outcome data for the spin request (e.g., an award amount of zero or more, depending on the outcome evaluation, the spin façade ID, the winning pattern, and other win details).

In the example embodiment, after receipt of the game join message, which identifies the outcome of the spin request, the game host server 420 initially transmits a spin start message to the game client 504 at operation 638. The spin start message triggers the slot UI 416 to begin spinning the simulated reels on the mobile device 404. The reels continue to spin while the game host server 420 performs transaction processing. The game host server 420 then performs one or more transactions associated with the spin request. First, the game host server 420 initiates a bet transaction by transmitting a bet request to the MGS server 432 at operation 640. The bet transaction identifies a funds source for the player 402 (e.g., as established in process 500) and a bet amount associated with this spin (e.g., as provided by the player 402 with the spin request). At operation 642, the MGS server 432 transmits a reserve transaction to the RGP server 434, which is sent along to the operator integration adapter 436 for processing. The operator integration adapter 436 transmits the bet request to the operator server 438, which processes the transaction (e.g., by deducting the bet amount from the funds source of the player 402). At operations 650, 652, 654, and 656, transaction completion information is sent back through to the game host server 420. The transaction completion information may include a status of the transaction (e.g., completed, failed) and may include balance information (e.g., a balance of the funds source of the player 402 after the bet amount has been deducted).

In situations where the bet transaction failed (e.g., where the funds source of the player 402 does not have sufficient funds to cover the bet amount for this spin request), the game host server 420 may identify the failure through the transaction status information and may transmit a wagering failure message to the game client 504 at operation 660, and may cancel any further actions for processing of the spin request (e.g., may ignore the game outcome determined in operations 620-636). Such a failure message may cause the game client 504 to display an error message to the player 402 and cancel the current spin (e.g., stop the simulated spinning without providing an award outcome).

In situations where the bet transaction succeeds, the game host server 420 evaluates the game outcome to determine if a non-zero award outcome is identified (e.g., if the spin resulted in a win). If the award outcome is greater than zero, then the player 402 has won an award amount during this spin. As such, the game host server 420 performs a second transaction with the operator server 438. More specifically, the game host server 420 generates and transmits a win transaction to the MGS server 432 and through to the MGP server 434, the operator integration adapter 436, and the operator server 438 in operations 640-646. The win transaction identifies the funds source as the target for crediting the award amount for this spin, as well as the award amount to be provided to the player 402. After crediting the funds source of the player 402 with the award amount, the operator server 438 similarly sends back a transaction status for the win transaction as well as updated balance information for the funds source (e.g., showing a current balance after crediting the award amount) in operations 650-656.

Once the game host server 420 has successfully processed both the bet transaction and the win transaction, the game host server 420 sends results data to the game client 504 at operation 660. The results data includes the ball call data and bingo card data provided by the resolution platform 450 for this spin request, as well as the award amount determined for this spin request, and balance information of the funds source after the bet, and optionally win, transactions are complete. In some embodiments, the game client 504 uses the award amount to determine a spin façade to display to the player 402 via the slot UI 416 (e.g., from a pre-existing database of façade outcomes that evaluate to an equivalent value of the award amount determined by the bingo evaluation). In other embodiments, the resolution platform 450 or the game host server 420 may provide the spin façade and may dictate to the game client 504 which spin façade to display (e.g., via a unique façade identifier). The spin façade is thus displayed to the player 402 by the game client 504 (e.g., in the spin UI 416), showing a reel outcome that exactly or approximately matches their award amount. The game client 504 may also display the bingo ball call and bingo card information to the player 402 via the bingo UI 414 and may also display current balance information of the funds source to the player 402.

Accordingly, the example game play resolution process 600 shown and described herein performs game resolution for a particular spin prior to performing any transactions associated with that spin. This "outcome first" ordering of events provides several significant technical advantages over a "bet first" model. Notably, if some type of processing failure happens while determining an outcome of a particular spin (e.g., in operations 614-636), since no bet transaction has yet been performed, the need to then process a refund transaction is thus avoided. This reduces communications bandwidth and associated processing of additional, unnecessary reconciliation processing (e.g., refund transactions) when some types of failures occur within the MGS 400. Further, unlike conventional Class 3 RNG-based game outcome determinations, the ball calls provided by bingo-based game source servers 464 are an asynchronous process (e.g., with balls continuing to be drawn independent of players' actions), and thus mobile delivery of a bingo-based game benefits from determining an outcome prior to verifying wager placement.

Additionally, the MGS 400 provides a solution that can dynamically scale to support the transient nature of mobile gaming. In the conventional land-based EGM environment (e.g., casino venue), the number of EGMs 104 at the venue is fixed. In contrast, with mobile or online gaming, the number of participating mobile devices 404 is frequently changing. The transient nature of mobile device participation with mobile or online gaming thus presents an additional technical challenge over conventional land-based EGM game play. More specifically, how can a gaming system provide support for a varying set of mobile devices as players start and stop gaming sessions where the gaming devices frequently change. Through the use of game source adapters 462, the MGS 400 can use the same game source server 464 as used by conventional land-based EGMs 104 by dynamically executing new instances of adapter/server pairs 460 when device limits are exceeded and by the adapters 462 and resolution platform 450 emulating other functions typically performed by EGMs 104 and their supporting systems. This architecture allows existing game source server code, which typically supports just a relatively static set of EGMs 104, to scale up and support numerous transient mobile devices, thereby avoiding a need to reprogram a game source server 464 specifically just to accommodate mobile devices.

While the above examples may be described in relation to bingo-related games (e.g., Class II games), the MGS 400 may support other underlying types of source wagering games as well. For example, in one embodiment, the MGS 400 may provide a lottery-based game outcomes with a slot façade. In lottery-based games, the MGS 400 may generate lottery outcomes based on a lottery pay table and random number generator output for lottery number calls. The lottery number calls (e.g., a set of randomly chosen lottery number outcomes from a predefined range of numbers) and lottery ticket generation (e.g., a set of randomly chosen lottery number selections from those same predefined range of numbers) may be provided for multiple mobile devices 404 by the resolution platform 450 or by the game source server 464 and optionally through the game source adapter 462. In another embodiment, the MGS 400 may provide scratch off-based game outcomes. In scratch off-based games, the MGS 400 may generate a scratch off ticket for each wager based on a scratch off pay table and randomly generated tickets. Similar to the bingo examples above, the MGS 400 may perform dynamic provisioning of adapter/server pairs 460 and may perform game resolution before conducting the bet and win transactions, and to similar benefit.

Figure 7:
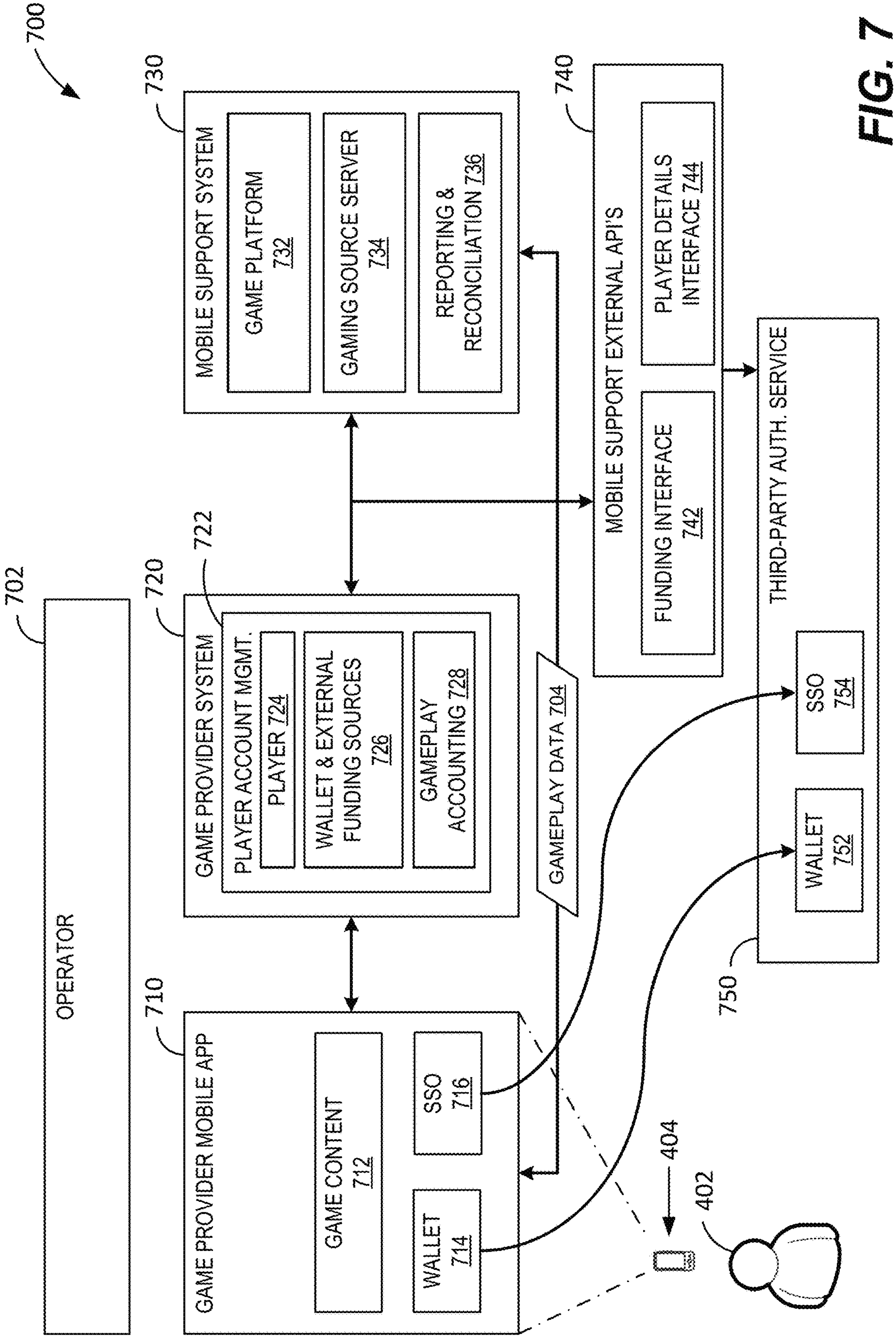
FIG. 7 is an architecture diagram of an example mobile gaming system for supporting wagering games on mobile devices as an online service.

FIG. 7 is an architecture diagram of an example mobile gaming system 700 for supporting wagering games on mobile devices 404 as an online service. In some embodiments, the mobile gaming system 700 may be similar to the MGS 400 shown in FIG. 4. In the example embodiment, an operator 702 (e.g., a casino company or other wagering operator) supports mobile gaming through a third-party partner, referred to here as a "game provider," and a mobile gaming support service provider. The game provider runs a game provider system 720 through which the mobile players 402 interact and play mobile wagering games via mobile devices 404 (e.g., personal computing devices or personal mobile devices, on-premise mobile devices provided to players 402 by the operator 702, or the like). The game provider publishes a game provider mobile app (or just "app") 710 for installation and execution on the mobile device 404, which facilitates game play on the mobile device 404. In some embodiments, the game provider may provide a browser-based interface that provides similar functionality of the app 710. In the example embodiment, the app 710 includes game content 712, a digital wallet 714, and an authentication component, represented here as a single sign-on ("SSO") component 716. The game content 712 may be similar to, or the app 710 may otherwise provide, the mobile lobby 410, game client wrapper 412, bingo UI 414, and slot UI 416 shown in FIG. 4.

In the example embodiment, the game provider system 720 may be executed by server computing device(s) local to or remote from wagering venues of the operator 702, and facilitates access to a library of wagering games that can be accessed via the app 710. The game provider system 720 (e.g., the PAM) may act as the game host server 420 or the operator server 438 shown in FIG. 4. The game provider system 720 provides a player account management component 722 that provides a player interface component 724 (e.g., for establishing contact between the game provider system 720 and the player apps 710 of mobile devices 404), a digital wallet and external funding sources component 726 (e.g., for facilitating digital wallet transactions from player wallets 714 or other transactions with other player accounts to facilitate wager-based game play and other player transactions), and a gameplay accounting component 728 (e.g., for facilitating wager gaming between mobile devices 404 and the mobile support system 730).

In this example embodiment, the game provider system 720 acts as a game provider and the mobile support system 730 is responsible for performing outcome determination for the games provided by the game provider system 720. The mobile support system 730 includes a game platform component 732 (e.g., one or more platforms for supporting wager outcome determination for various types of wager-based games), a gaming source server component 734 (e.g., one or more servers for providing game source data, such as a bingo ball call or lottery call), and a reporting and reconciliation component 736 (e.g., for providing accounting and reporting functionality for the wager activities performed by the mobile support system 730). The mobile support system 730 and the components shown here may be similar to the mobile support system 430 and associated components shown in FIG. 4.

The mobile support system 730 also provides several mobile support external APIs 740, which includes a funding interface component 742 (e.g., for allowing game provider system 720 or the mobile support system 730 to perform digital wallet transactions or other financial transactions with other financial institutions or businesses) and a player details interface component 744 (e.g., giving access to player details, such as player name, player ID, or the like).

The MGS 700 also includes an authentication service 750 that provides a digital wallet component 752. The digital wallet component 752 can interact with the digital wallet 714 of the player 402, or with the game provider system 720 or mobile support system 730 via the funding interface 742, to perform digital wallet transactions. The authentication service 750 also provides an SSO component 754 that can perform authentication services for the players 402 and devices 404 (e.g., using player details provided by player details interface 744). The services 750 may be linked to an external funds provider, an authentication system, and player data source provided by a particular casino operator. The third-party authentication service 750 may be similar to the operator server 438 shown in FIG. 4.

During operation, once player authentication and execution of a particular game has been established on the mobile device 404, the mobile support system 730 may communicate directly with the wagering game executing on the mobile device 404. For example, the mobile support system 730 may receive spin requests as gameplay data 704 each time the mobile player 402 submits a wager (e.g., pressing a spin button within the game). Upon determining an outcome for the spin request and processing any associated transactions for the wager (e.g., based on the process 600 shown in FIG. 6), the mobile support system 730 may transmit outcome data back to the mobile device 404 as gameplay data 704 (e.g., bingo ball calls, bingo cards, wager outcomes, balance information, or the like).

The architecture of the MGS 700 shown in FIG. 7 provides various technical benefits as compare to, for example, a single integrated system that provides mobile wagering games to players 402. For example, the division of roles allows an operator to select and offload processing responsibility of providing mobile game access to their patrons while still backing the wagering activities. Further, the game provider can focus on aspects of content creation and player experience (e.g., with games provided by the app 710, with the user experience provided by the app 710) without needing to provide game resolution processing and all of the regulatory hurdles that such processing entails. Similarly, the provider of the mobile support system 730 can focus on creating a protected outcome determination system that can be used across various games and game providers. For example, the mobile support system provider may provide the mobile support system 730 as a service to many different game providers. This MGS 700 is independent of any specific implementation of any service. Services like the digital wallet 752, the SSO 754, or the mobile support system 730 can be independently replaced, updated, or scaled. Further, this MGS 700 architecture separates the PAM 722 from the mobile support system 730, thereby allowing the mobile support system 730 to support and integrate with multiple PAMs. For example, some PAMs may provide online play, land-based play, or both online and land-based play, and this MGS 700 is capable of providing support for any such PAMs. Since each application component can be scaled independently, this flexibility gives improved performance with optimized resource utilization.

Remote Game Play and Funding Implementations

Figure 8:
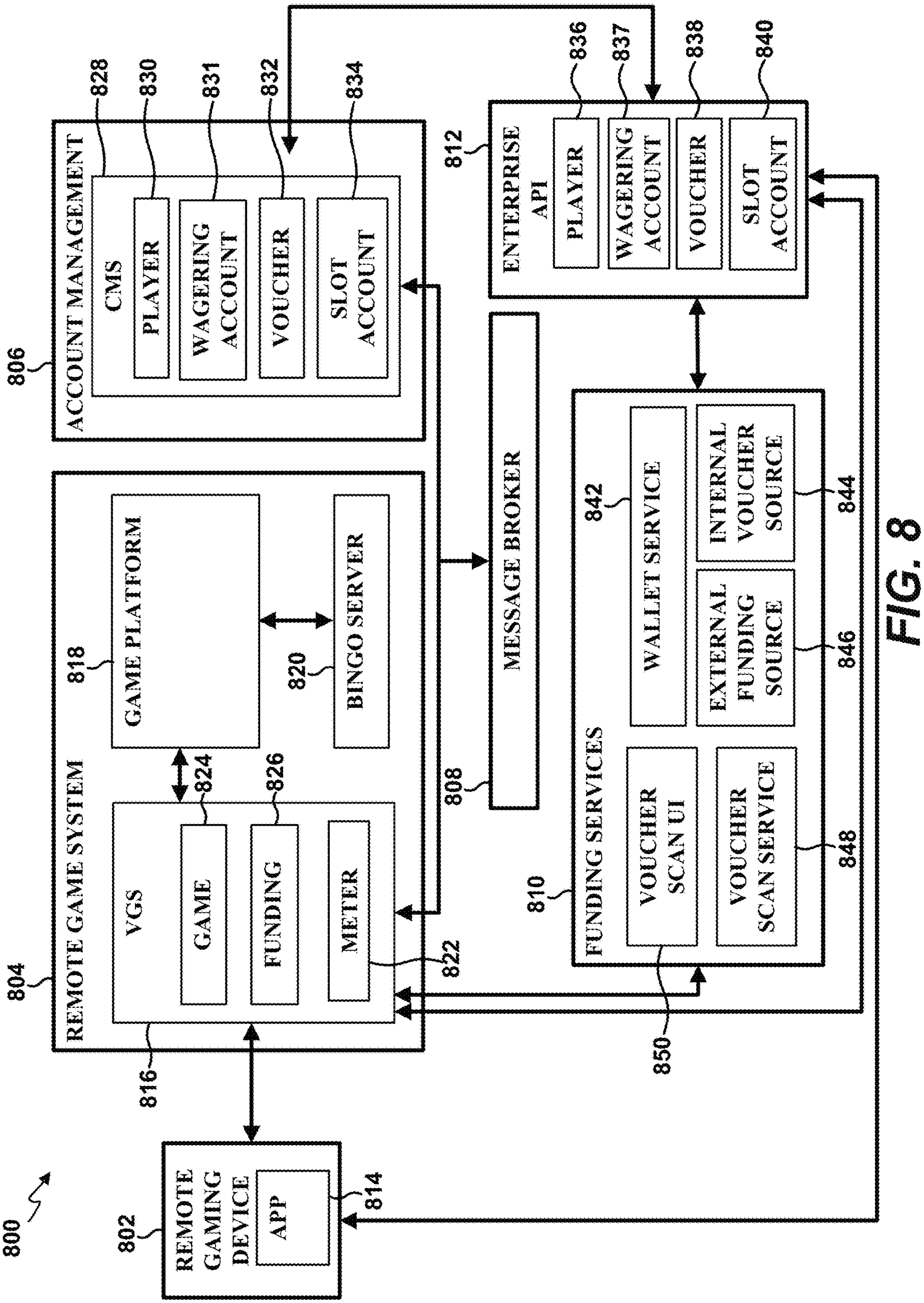
FIG. 8 is a block diagram of an implementation of a remote game play architecture that supports and funds remote game play with a prepaid game voucher.

FIG. 8 is a block diagram of an implementation of a remote game play architecture 800 that supports and funds remote game play with a prepaid game voucher. The use and discussion of FIG. 8 is for exemplary purposes and is not intended to limit the disclosure to the specific remote game play architecture 800 implementation. As an example, the remote game play architecture 800 supports remote game play in a Class II wagering environment. The remote game play architecture 800 could also be a framework that supports other game types, such as scratch tickets and iLottery. Specifically, although FIG. 8 illustrates that the remote game system 804 includes a bingo server 820, the remote game system 804 could more generally utilize a central determination gaming system to support not only Class II bingo, but other game types such as scratch tickets and iLottery. In another example, rather than having the bingo server 820 be part of the remote game system 804, the bingo server 820 could be external to the remote game system 804. In particular, the bingo server 820 could be part of a central determination gaming system server 106 shown in FIGS. 1 and 2. With reference to FIG. 3, the remote gaming device 802 shown in FIG. 8 could correspond to UI system 302, and remote game system 804 corresponds to game processing backend system 314. In other words, the remote game system 804 can include and/or implement functionality relating to one or more components shown in FIG. 2's gaming device 200, such as RNG 212.

In FIG. 8, the remote game play architecture 800 includes a remote gaming device 802 with an app 814. The remote gaming device 802 shown in FIG. 8 can be a mobile gaming device 256 shown in FIG. 2B and/or an EUD 264 shown in FIG. 2C. For example, the remote gaming device 802 could be a smart phone, a tablet, a laptop computer, a personal computer, and/or a special purpose device configured for remote game play. The app 814 is executable software and/or code made available by downloading the software from a remote host, such as an online app store, website, shared folder, or other remote data site (e.g., from a gaming data center 276). App 814 may be a custom app specifically designed for remote game play or part of a more generalized app that includes functionality for remote game play with real money wagering. As an example, app 814 could be a loyalty app that includes not only remote game play with real money wagering, but other casino-related features and functions, such as tracking loyalty points, comps, and digital gaming wallet balances. In another example, app 814 is a gaming app customized for remote game play and does not provide other casino-related functionality.

In one or more implementations, to comply with regulations and/or other third-party policies, the remote host (not shown in FIG. 8) restricts when the remote gaming device 802 can download the app 814 according to the location of the remote gaming device. For example, before a remote host authorizes a remote gaming device 802 to download app 814, the remote host receives location information of the remote gaming device 802 and checks whether the remote gaming device 802 is located in one or more designated geographical zones (e.g., within a wager-enabled zone or jurisdiction). If the remote host determines that the device is located within an appropriate geographical zone, the remote host permits downloading app 814 to remote gaming device 802. After installing app 814, for remote gaming device 802 to run app 814 or enable remote game play functionality within app 814, the remote gaming device 802 checks and verifies that the remote gaming device 802 is within one or more designated remote gaming zones. If the app 814 determines that the remote gaming device 802 is not within the designated remote gaming zone, the app 814 fails to run and/or disables the remote gaming functionality. The remote gaming zones could include designated gaming zones the permits wagering activity and playing wagering games and other venue or jurisdictional zones outside the designated gaming zones. The other venue or jurisdictional zones could correspond to zones that typically do not permit in-person wagering activities and/or playing wagering games. Examples of these venue or jurisdictional zones include casino hotel rooms, dining areas, retail, recreational facilities (e.g., swimming pool) and other on-site casino locations. The designated geographical zones to download app 814 can include the remote gaming zones and/or other areas outside the remote gaming zones.

With reference to FIG. 3, the remote gaming device 802 shown in FIG. 8 corresponds to UI system 302. As such, when app 814 loads and runs on remote gaming device 802, the remote gaming device 802 is unable to generate random based game outcomes for a wagering game. Using FIG. 3 as an example, remote gaming device 802 may not include a gaming RNG 318 that securely produces random numbers for determining random based game outcomes. Instead, the app 814 may store and/or load UI elements and other visual assets to present the results (e.g., payout amount) after the remote game system 804 determines the random based game outcome. The remote gaming device 802 may receive the presentation information directly from remote game system 804 or relevant presentation information (e.g., RNG seeds and/or credit values) to derive how to present the results to a player. In one or more implementations, to derive how to present game outcomes received from the remote game system 804, the app 814 could include a non-gaming RNG that performs similar functionality as non-gaming RNG 319A shown in FIG. 3. For example, remote game system 804 may provide credit values determined from the games outcomes to the remote game device 802. Based on the credit values, the remote game device 802 may utilize the non-gaming RNG to randomly determine how to present the credit values.

Referring to FIG. 3 again, remote game system 804 could correspond to game processing backend system 314. In one or more implementations, remote game system 804 can be physically located in a designated gaming zone and/or other zones defined for wagering game play. Alternatively, remote game system 804 can be physically located outside the designated gaming zone depending on regulations. To perform operations associated with the game processing backend system 314, the remote game system 804 includes and/or provides a virtual gaming service 816 that manages the game session for the remote gaming device. In one or more implementations, the virtual gaming service 816 could be or is part of a virtual machine, virtual container, or other virtual computing resource allocated within remote game system 804. Additionally, or alternatively, virtual gaming service 816 could be or is part of a workstation, server, and/or other physical computing resource. In FIG. 8, the virtual gaming service includes a game module 824 that performs, facilitates, and manages game processing operations to generate the random based game outcomes. For example, when the remote gaming device 802 receives one or more player inputs, the remote gaming device 802 generates and sends over one or more RNG and/or game initiation calls to remote game system 804. Virtual gaming service 816 processes the RNG and/or game initiation calls by communicating with game platform 818, generating random numbers used to generate one or more random based game outcomes (e.g., generating bingo cards), and evaluating relevant game patterns (e.g., bingo patterns with a ball call) to determine payout amounts.

FIG. 8 also illustrates that the virtual gaming service 816 includes a funding module 826 and a meter module 822. The funding module 826 supports and/or facilitates fund transactions, such as transactions relating to the prepaid game voucher and/or transactions associated with a digital wallet. Regarding utilizing prepaid game vouchers, funding module 826 stores relevant prepaid game voucher information (e.g., voucher value and identification information) for a game session and/or communicates prepaid game voucher information with other systems. In one or more implementations, the funding module 826 is also setup to store and associate player identifying information, remote gaming device information, geolocation information, and/or date and time information along with the prepaid game voucher information. Meter module 822 tracks wager and other credit metering information throughout the gaming session. Specifically, the meter module 822 performs functions that typical hardware meters or other meters within an EGM perform to ensure regulatory compliance and monitor player credit balance. As an example, meter module 822 can record the total amount of money wagered on the gaming device, total amount of money deposited, total amount of money withdrawn, total amount of winnings on the EGM. In FIG. 8, meter information is shared between the virtual gaming service 816 and account management system 806 using a message broker 808. The message broker 808 is a system that manages a variety of events, such as card-in events and/or fund transfer events.

As shown in FIG. 8, the virtual gaming service 816 also includes a game platform 818 and bingo server 820. In a Class II environment, the game platform 818 is setup to initiate and manage virtual gaming services entering and leaving one or more bingo game sessions. Over a period of game play, a virtual gaming service 816 could enter numerous bingo game sessions. For each bingo game session, the game platform 818 communicates with bingo server 820 to obtain a ball call and passes the information to the appropriate virtual gaming services 816. After receiving the ball call information, virtual gaming services 816 compares and evaluates the ball call to one or more bingo cards. The virtual gaming service 816 and/or the bingo server 820 could generate, provide, and/or select the bingo cards.

The funding module 826 in virtual gaming service 816 communicates with funding services 810 to initiate the transfer of funds for use in a game session with the remote gaming device 802. In FIG. 8, the funding services 810 represents one or more systems (e.g., financial provider and/or broker systems) used to verify, authenticate, and transfer funds to and/or from external funding source 846 and internal voucher source 844. The funding services 810 includes a voucher scan UI 850 and a voucher scan service 848 to view, scan, digitize and store prepaid game voucher information and/or other relevant information. Voucher scan service 848 also provides voucher information to a wallet service 842, which acts as a financial transaction broker. The wallet service 842 can broker funding transactions amongst the internal voucher source 844, external funding source 846, and/or other funding accounts. Internal voucher source 844 represents an internally managed system that store, tracks, and manage funds for voucher account system 832. The internal voucher source 844 receives prepaid game voucher information from wallet service 842 and sends relevant prepaid game voucher information and associated funds via enterprise API 812 to account management system 806. The external funding source 846 could include third-party financial provider and/or institution systems (e.g., banks) and/or other gaming systems (e.g., other casino venues managed by a specific casino company or amongst different casino companies) that manage other accounts for a player external to the remote game play architecture 800. For fund transfers relating to a digital wallet, the wallet service 842 could initiate and/or verify a fund transfer from the external funding source 846 to a player's wagering account. Specifically, the wallet service 842 sends fund information via enterprise API 812 to wagering account system 831 within account management system 806.

Although FIG. 8 illustrates that voucher scan UI 850 and voucher scan service 848 are part of funding services 810, one or more operations of the voucher scan UI 850 and a voucher scan service 848 could be offloaded to other systems and/or other devices. For example, the voucher scan UI 850 can be loaded as part of app 814 to utilize remote gaming device 802 to scan or capture an image of physical prepaid game vouchers. In another example, a kiosk that includes a voucher reader or optical scanner is loaded with the voucher scan UI 850. The fund services 810 and/or account management system 806 could be setup to restrict the sale of physical prepaid game voucher to be within designated gaming zones and/or other wager-enabled zones prior to remote game play. Examples of other wager-enabled zones include restaurants, night-clubs, retail outlets, and other areas and/or businesses within casino venues. The wager-enabled zones, remote gaming zones, and designated gaming zones previously described could overlap in at least some of geographical areas. In other examples, the wager-enabled zones, remote gaming zones, and designated gaming zones could be completely separate with no overlapping geographical areas.

The enterprise API 812 is an interface that communicates fund transaction information, gaming device information, and/or player account information amongst the remote gaming device 802, the account management system 806, the funding services 810, and the remote game system 804. The enterprise API 812 facilitates communication between the different systems for a variety of different accounts and/or systems. FIG. 8 illustrates that enterprise API 812 includes a player module 836, wagering account module 837, voucher module 838, and slot account module 840. The player module 836, wagering account module 837, voucher module 838, and slot account module 840 provide interfaces with the player tracking system 830, wagering account system 831, voucher account system 832, and slot account system 834 stored and managed by the central management system 828. Player tracking system 830 manages and tracks player and/or loyalty data at one or more casino venues venue. Wagering account system 831 manages and tracks player funds accounts (e.g., digital gaming wallet) managed by the one or more casino venues, and voucher account system 832 manages, issues, and tracks vouchers, such as authenticating existing prepaid game vouchers and issuing new prepaid game vouchers. Slot account system 834 manages metering reporting, event logging, and bonusing and progressive jackpot features, resulting from game play for one or more virtual game services. To communicate relevant data, enterprise API 812 may utilize a protocol, such as the Slot Accounting System (SAS) protocol or Game to System (G2S) protocol.

Figure 9:
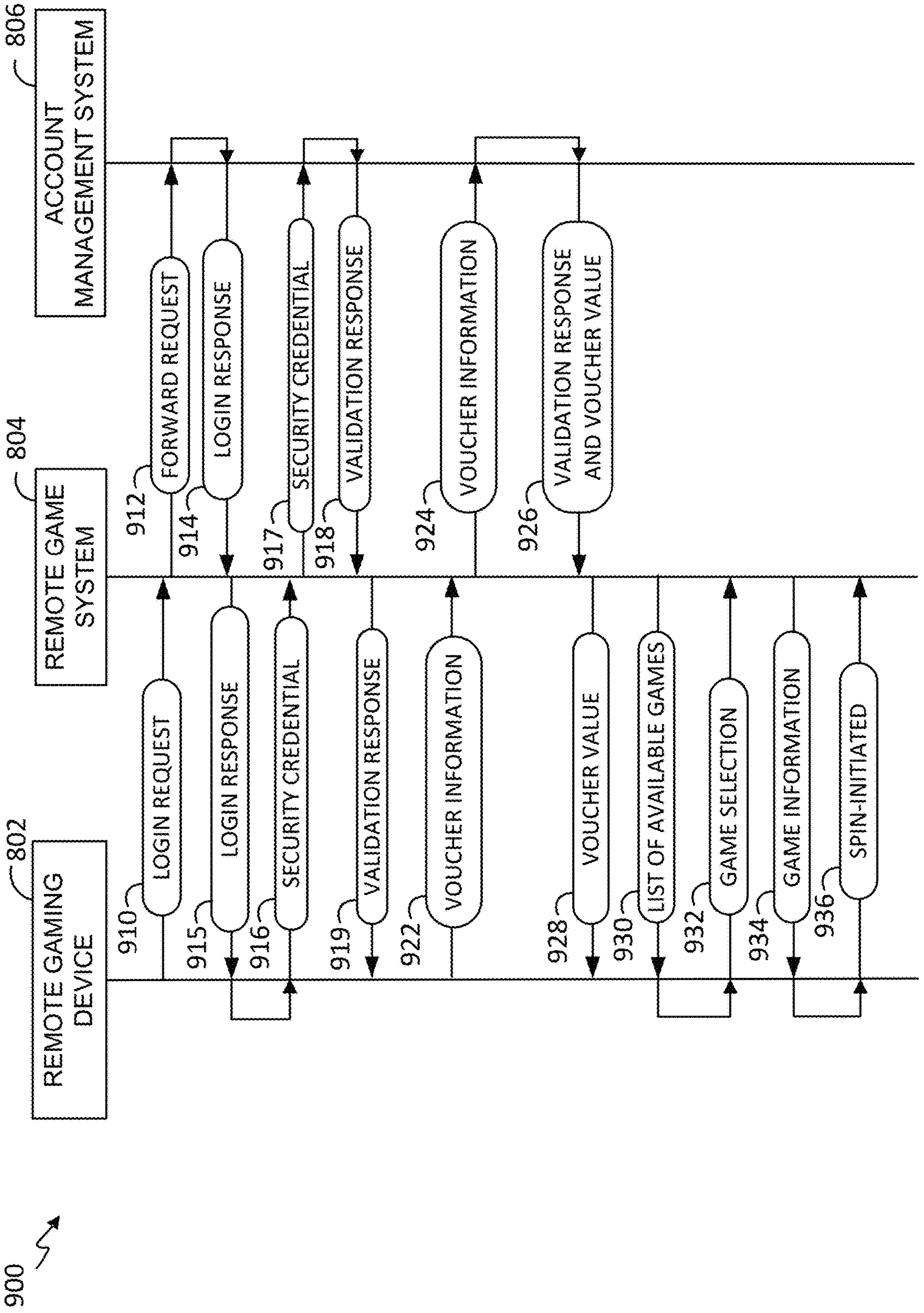
FIG. 9 is a protocol diagram that depicts a protocol sequence for logging in, funding a game session with a prepaid game voucher, and selecting a game for remote game play.

FIG. 9 is a protocol diagram that depicts a protocol sequence 900 for logging in, funding a game session with a prepaid game voucher, and selecting a game for remote game play. Specifically, messages 910-919 correspond to exchanging data for login operations, messages 922-928 correspond to exchanging data for funding operations, and messages 930-936 corresponds to exchanging data for selecting a game for remote game play. With reference to FIG. 8, protocol sequence 900 can be implemented using the remote game play architecture 800. The use and discussion of FIG. 9 is only an example to facilitate explanation and is not intended to limit the disclosure to this specific example. Specifically, messages 910-936 do not necessarily need to perform in the order as depicted in FIG. 9. As an example, protocol sequence 900 may communicate messages 922-928 after communicating messages 930-936. Additionally, or alternatively, for ease of explanation, protocol sequence 900 does not include messages communicated with other systems, such as funding services 810.

To start login process to an app and/or functionality within app, protocol sequence 900 starts with transmitting a login request 910 from remote gaming device 802. In one or more implementations, the login request 910 includes player information, such as loyalty card information, entered and/or stored in the remote gaming device 802. In FIG. 9, the remote game system 804 forwards the player information within the forward request 912 to the account management system 806. When the account management system 806 receives the forward request 912, the account management system 806 processes the player information. Using FIG. 8 as an example, the account management system 806 processes the player information with player tracking system 830 and subsequently transmits a login response based on processing the player information. In one or more implementations, the login response includes a challenge or some other type of security credential request to verify and authenticate the remote gaming device's 802 login request. The remote game system 804 receives the login response 914 and forwards the login response 915 to remote gaming device 802. Based on the login response 915, the remote gaming device 802 obtains and sends security credential 916 to remote game system 804, which then forwards security credential 917 to account management system 806. The account management system 806 evaluates security credential 917 to verify and authenticate the remote gaming device 802. The account management system 806 then sends a validation response 918 that can either approve or deny the login request 910. The remote game system 804 receives the validation response 918 and forwards the validation response 919 to remote gaming device 802.

After remote gaming device 802 logins into the app, the remote gaming device may scan or capture an image of the prepaid gaming voucher. After remote gaming device 802 scans or captures an image of the prepaid gaming voucher, the remote gaming device 802 sends the voucher information 922 (e.g., image of the prepaid gaming voucher) to the remote game system 804. The remote game system 804 stores the voucher information 922 received from the remote game system 804 and forwards voucher information 924 to the account management system 806. The account management system 806 receives the voucher information 924 and authenticates the prepaid gaming voucher and determines a voucher value. Recall that the account management system 806 and/or funding services 810 could have previously issued a corresponding prepaid gaming voucher within a wager-enabled zone. During the authentication process, account management system 806 verifies and authenticates the issued prepaid gaming voucher with the received voucher information 924. Voucher information 924 could include the prepaid game voucher identifier information, remote gaming device information, geolocation information, and/or date and time information. Once account management system 806 completes the authentication operation, the account management system 806 sends a validation response and voucher value 926 to the remote game system 804. The remote game system 804 receives the message from the account management system 806 and in response provides the voucher value 928 to the remote gaming device.

FIG. 9 also illustrates that after remote gaming device 802 logins into the app, the remote game system 804 provides a list of available games to the remote gaming device 802. When the remote gaming device 802 receives the list of available games, the remote gaming device 802 may present the list of available games in a UI (e.g., a UI presented in app 814 shown in FIG. 8) to a player. In one or more implementations, the UI could present a virtual lobby similar to a casino floor that a player could navigate through to find an appropriate game. Within the virtual lobby, the remote gaming device 802 receives one or more player inputs to select a game from the available games. Based on the selected game, the remote game system 804 sends game selection message 932 to the remote game system 804. The remote game system 804 then sends game related information 934 back to remote gaming device 802. Based on the game related information 934, the remote gaming device 802 can build out and load the remote game to present in a UI. The remote gaming device 802 may then receive one or more player inputs to initiate a spin for the remote game. Remote gaming device 802 sends spin-initiated message 936 to remote game system 804 for processing. As previously discussed, remote game system 804 performs one or more RNG calls and/or communicates with another system (e.g., a bingo server) to determine random based game outcomes for the spin-initiated message 936.

Figure 10:
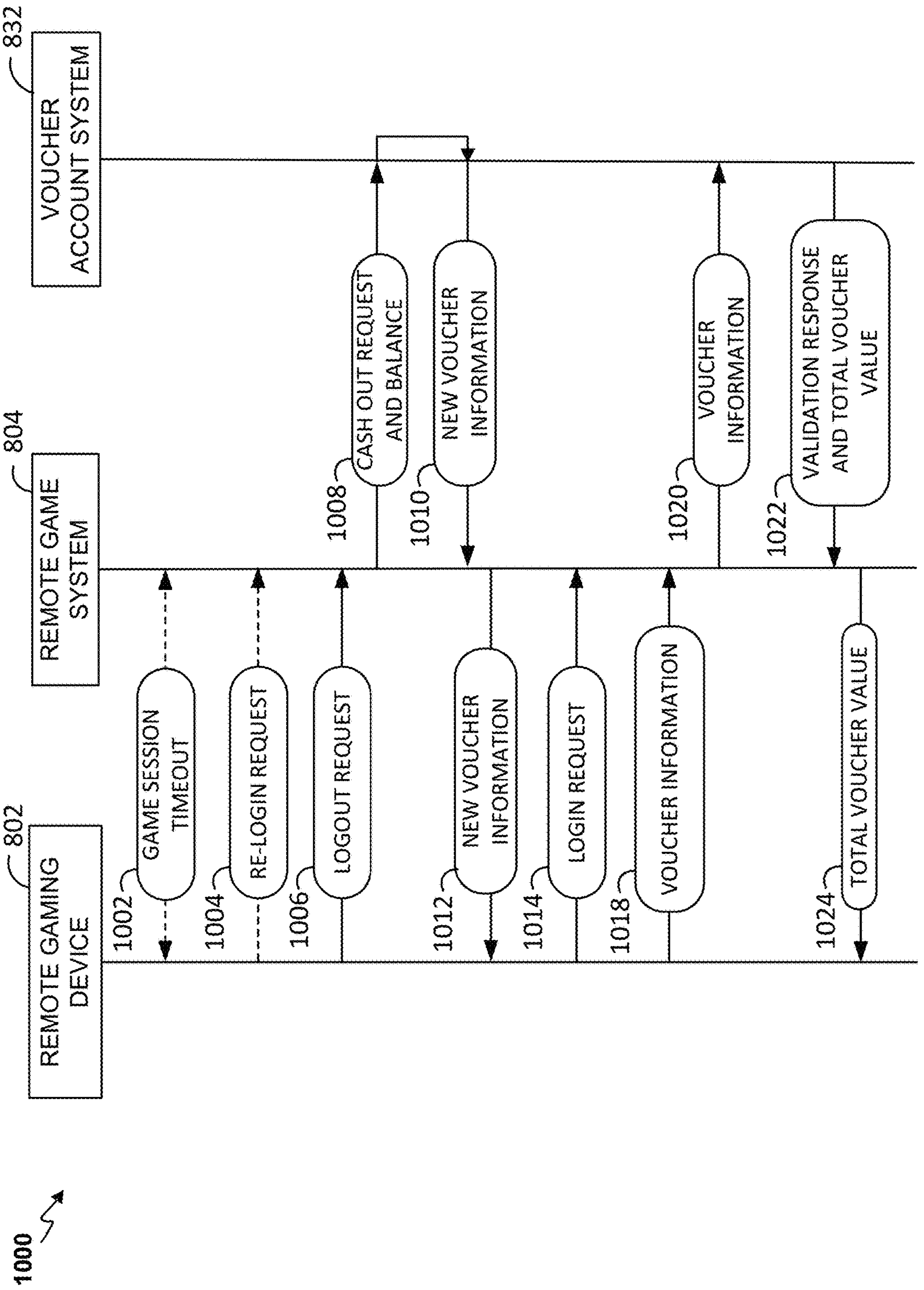
FIG. 10 is a protocol diagram illustrating a protocol sequence for ending and/or logging out of a game session when funding remote game play with a prepaid game voucher.

FIG. 10 is a protocol diagram illustrating a protocol sequence 1000 for ending and/or logging out of a game session when funding remote game play with a prepaid game voucher. In particular, the protocol sequence 1000 illustrates how remote game play architecture 800 shown in FIG. 8 manages fund transactions for unexpected terminations and explicit logouts of a game session. Using FIG. 8 as an example, during remote game play, the established game session between the remote gaming device 802 and the remote game system 804 may terminate without the remote gaming device 802 providing explicit instructions to end the game session with the remote game system 804. These unexpected terminations of the game session could occur from a variety reasons, such as execution errors that causes app 814 to crash, loss of network connection, loss of power for the remote gaming device 802, and/or the remote gaming device 802 moves outside the remote gaming zones. Similar to EGMs located on a casino floor, the virtual gaming service 816 acts as a state machine and saves the current state of the gaming session. By saving the current state of the gaming session, the virtual gaming service 816 can return to the last saved state prior to the unexpected termination of the game session.

The protocol sequence 1000 shown in FIG. 10 starts with an unexpected termination of a game session. When a game session unexpectedly terminates, a game session timeout 1002 occurs between remote gaming device 802 and remote game system 804. During the game session timeout 1002, remote gaming device 802 and/or remote game system 804 may attempt to exchange data or verify the network connection between each other. When the remote game system 804 determines that an unexpected session terminates, rather than notifying voucher account system 832 to issue a new voucher, the remote game system 804 temporarily holds the fund within the gaming environment. In one or more implementations, to hold the funds within the gaming environment, remote game system 804 holds off on notifying the voucher account system 832 for a designated period. Using FIG. 8 as an example, the remote game system 804 may send fund information only to the wagering account system 831 or avoid sending fund information to the central management system 828 altogether. If the remote game system 804 is unable to re-establish the game session with remote gaming device 802 within the designated period, the remote game system 804 notifies the voucher account system 832 to issue a new voucher. In one or more implementations, to notify the voucher account system 832, the remote game system 804 notifies the central management system 828, which routes the notification to the voucher account system 832.

In FIG. 10, the remote game system 804 sends re-login request 1004 prior to the designated period expiring. Although not explicitly shown in FIG. 10, the protocol sequence 1000 could exchange messages between the remote gaming device 802, remote game system 804 and account management system 806 (e.g., messages 910-919 in FIG. 9) to authenticate the re-login request 1004. Based on the re-login request 1004 and after authenticating the re-login request 1004, the remote game system 804 reloads the funds that were available prior to the unexpected termination of the game session onto the meter. In one or more implementations, the remote game system 804 could reload the funds based on the fund information temporarily stored on the remote game system 804 (e.g., virtual gaming service 816 in FIG. 8). In other implementations, the remote game system 804 could receive the available funds from another system that previously saved and stored on the fund information (e.g., wagering account system 831 shown in FIG. 8).

During an active game session, when the remote gaming device 802 receives instructions from one or more player inputs to end a game session for remote game play, the remote gaming device 802 sends a logout request 1006 to remote game system 804. Remote game system 804 receives logout request 1006 and generates and sends a cash out request and balance 1008 to the voucher account system 832. The cash out request and balance 1008 includes the remaining game credits and/or monetary balance left on the meter when receiving the logout request 1006 from remote gaming device 802. When voucher account system 832 receives the cash out request and balance 1008, voucher account system 832 generates and issues a new voucher based on the balance information. Voucher account system 832 sends the new voucher information to remote game system 804 and remote game system 804 stores the monetary value. Afterwards, remote game system 804 sends voucher information 1012 to remote gaming device 802.

When remote gaming device 802 receives the voucher information 1012, the remote gaming device 802 could present a digital voucher within app 814.

After ending a game session by logging out, the remote gaming device 802 may subsequently establish a new game session for remote game play. Although not shown in FIG. 10, the protocol sequence 1000 could exchange messages 910-919 to perform login operations. In FIG. 10, when remote gaming device 802 establishes the new game session based on login request 1014, any additional prepaid gaming vouchers captured and stored into the remote gaming device 802 is sent to remote game system 804 via voucher information 1018. The voucher information 1018 may not include the digital voucher associated with voucher information 1012 since remote game system 804 may have previously stored the voucher information during the cash out operation. The remote game system 804 sends voucher information 1020, which includes the voucher information 1018 and the digital voucher associated with voucher information 1012, to voucher account system 832. After voucher account system 832 processes voucher information 1020, voucher account system 832 sends a validation response and the total voucher value 1022 to the remote game system 804. The remote game system 804 loads game credits onto the meter based on the total voucher value 1022. The remote game system 804 also sends the total voucher value 1024 to remote gaming device 802.

Figure 11:
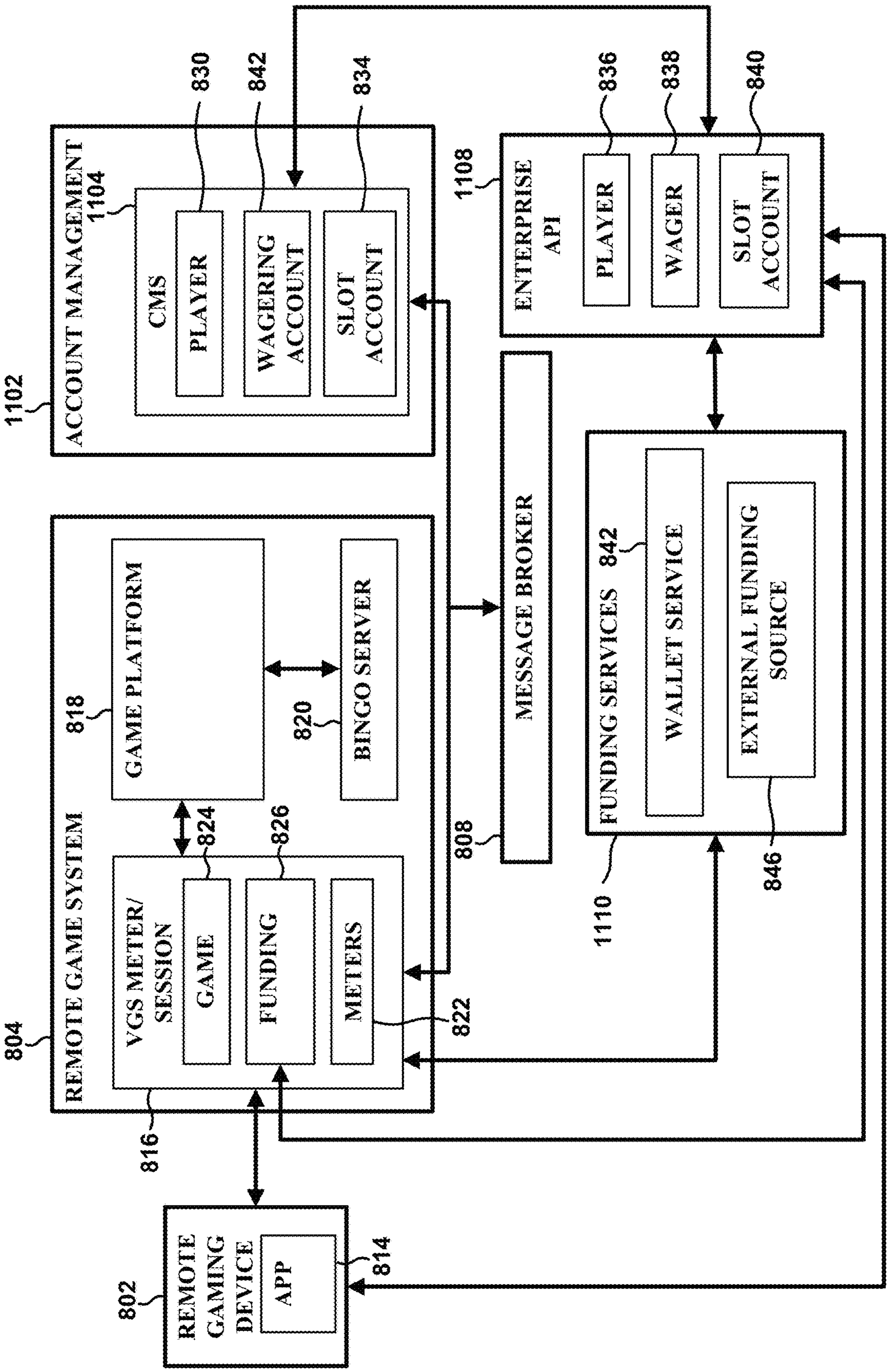
FIG. 11 is a block diagram of another implementation of a remote game play architecture that supports and funds remote game play using a digital gaming wallet.

FIG. 11 is a block diagram of another implementation of a remote game play architecture 1100 that supports and funds remote game play using a digital gaming wallet. Remote game play architecture 1100 is substantially similar to remote game play architecture 800 implementation except that the funding services 1110, enterprise 1108, and account management system 1102 do not support the use of prepaid game vouchers purchased outside a designated gaming zone. Similar to the remote game play architecture 800, remote game play architecture 1100 can support remote game play in Class II wagering games and other game types, such as scratch tickets and iLottery. Stated another way, remote game play architectures 800 and 1100 support not only real-time remote game play, but also predetermined or future game outcomes.

Figure 12:
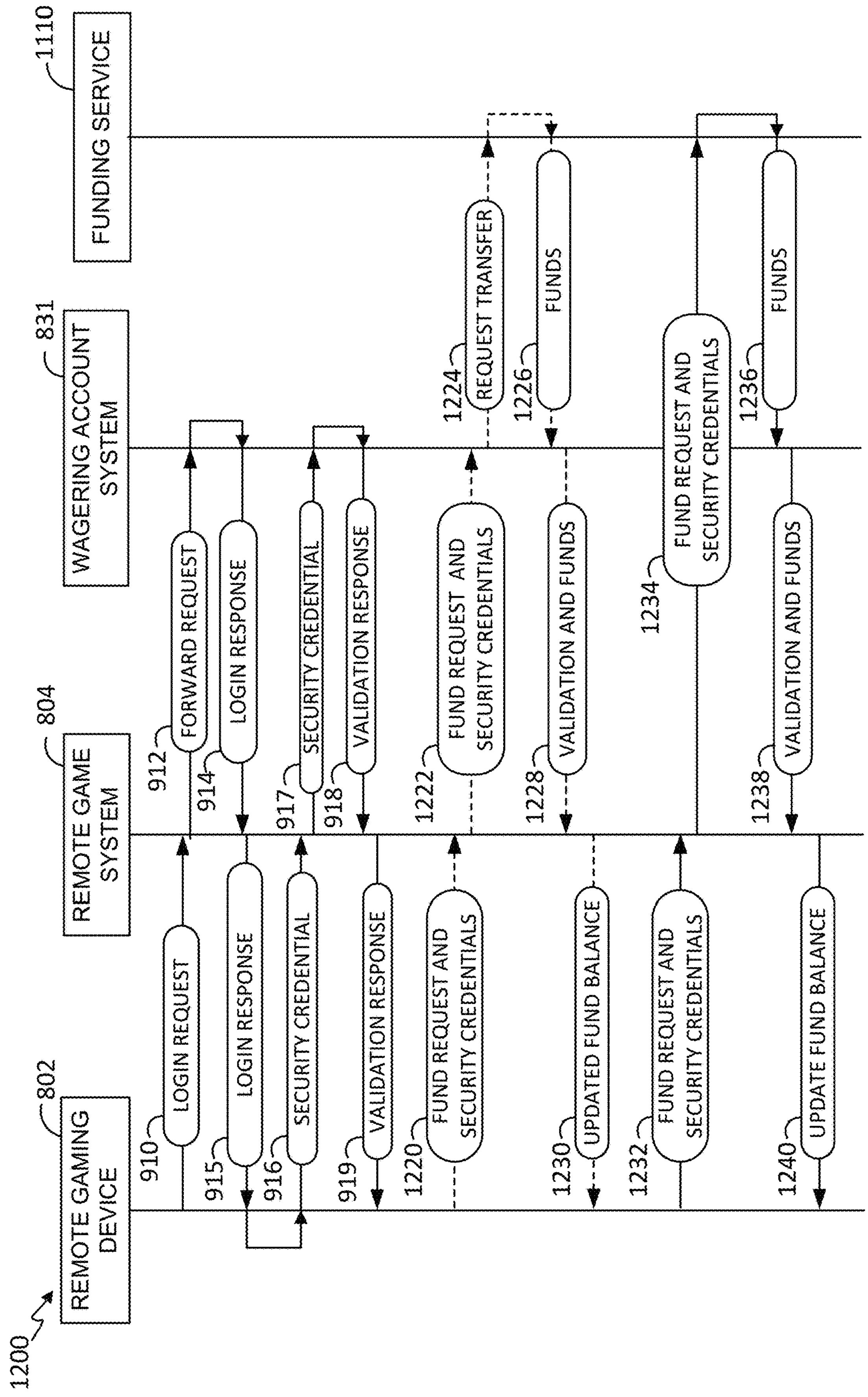
FIG. 12 is a protocol diagram that depicts a protocol sequence for logging in and funding a game session with a digital gaming wallet.

FIG. 12 is a protocol diagram that depicts a protocol sequence 1200 for logging in and funding a game session with a digital gaming wallet. Remote game play architectures 800 or 1100 can implement protocol sequence 1200 to fund a digital gaming wallet managed by the wagering account system 831. Protocol sequence 1200 includes two different funding operations that could be implemented within wagering account system 831. One funding operation includes exchanging messages 1220-1230 and another funding operation includes exchanging messages 1232-1240. The use and discussion of FIG. 12 is only an example to facilitate explanation and is not intended to limit the disclosure to this specific example. As an example, remote game play architectures 800 and 1100 could implement one of the funding operations while in another example, remote game play architectures 800 and 1100 could implement both funding operations. Additionally, or alternatively, for ease of explanation, protocol sequence 900 does not include messages communicated with other systems, such as funding services 810.

FIG. 12 performs a login process that is substantially similar to the login process shown in FIG. 9. After remote gaming device 802 logins into the app, the remote gaming device 802 sends a fund request and security credentials to remote game system 804. The fund request provides instructions to transfer funds from an external funding source to a digital gaming wallet account managed by the wagering account system 831. When the remote game system 804 receives the fund request and security credentials 1220, the remote game system 804 processes the message and forwards the relevant information into fund request and security credentials 1222 to wagering account system 831. In one or more implementations, the remote game system 804 stores the fund information sent in the fund request and security credentials 1220. When the wagering account system 831 receives fund request and security credentials 1222, the wagering account system 831 authenticates the fund request and sends a fund request transfer 1224 to funding service 1110. The funding service 1110 verifies the fund request transfer 1224 and provides funds 1226 to wagering account system 831 (e.g., a digital gaming wallet). The wagering account system 831 can send a validation response and funds 1228 to remote game system 804 for remote game play. The remote game system 804 may then send an updated fund balance 1230 to remote gaming device 802.

FIG. 12 also illustrates another funding operation that starts with the remote gaming device 802 sending a fund request and security credentials to remote game system 804. Rather than having remote game system 804 send the fund request and security credentials 1234 to the wagering account system 831, the remote game system 804 sends the fund request and security credentials 1234 directly to the funding service 1110. The funding service 1110 verifies the fund request and security credentials 1234 and provides funds 1236 to wagering account system 831 (e.g., a digital gaming wallet). The wagering account system 831 can send a validation response and funds 1238 to remote game system 804 for remote game play. The remote game system 804 may then send an updated fund balance 1240 to remote gaming device 802.

Figure 13:
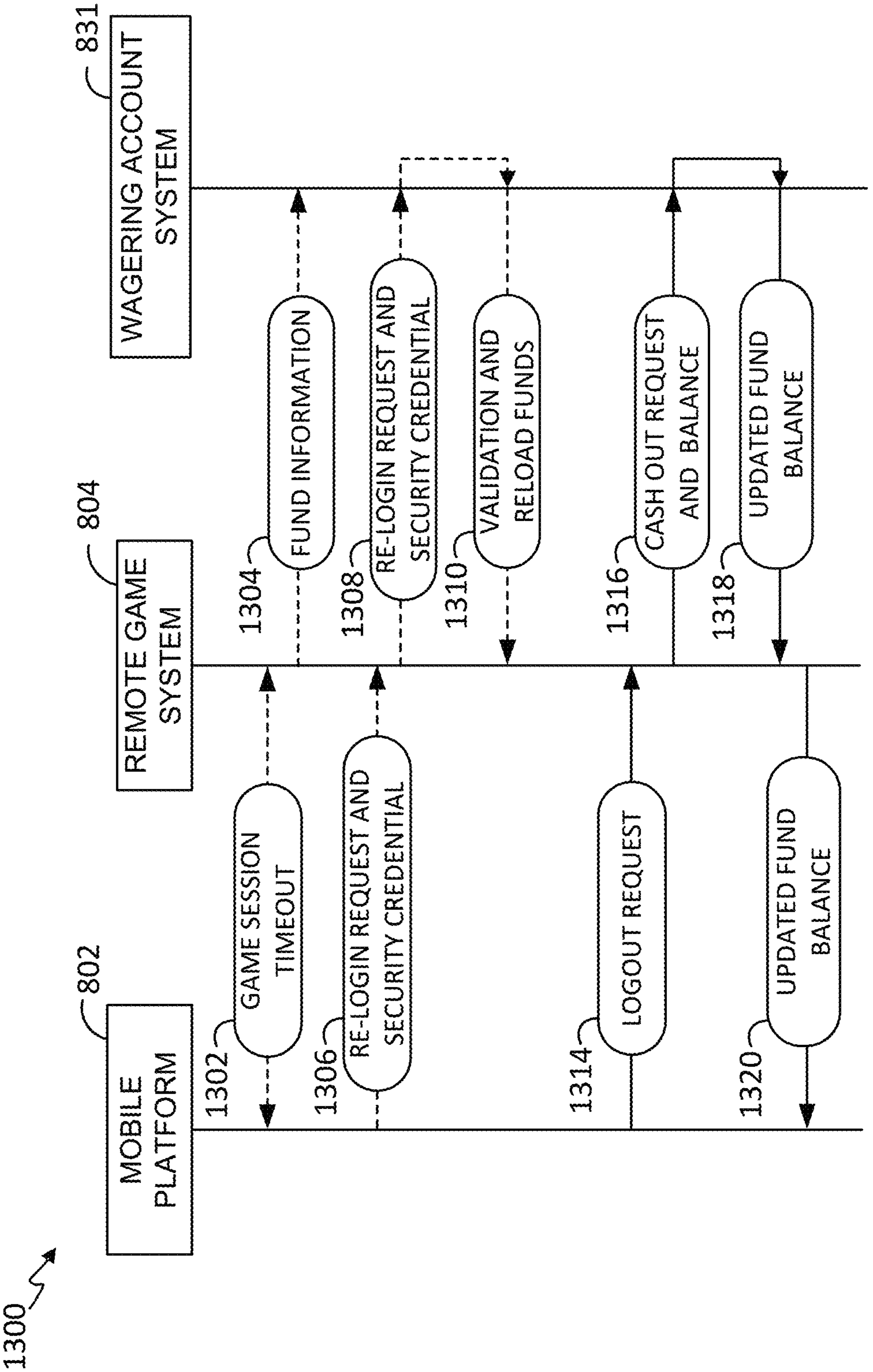
FIG. 13 is a protocol diagram illustrating a protocol sequence for ending and/or logging out of a game session when funding remote game play with a digital gaming wallet.

FIG. 13 is a protocol diagram illustrating a protocol sequence 1300 for ending and/or logging out of a game session when funding remote game play with a digital gaming wallet. In particular, the protocol sequence 1300 illustrates how remote game play architectures 800 and 1100 shown in FIGS. 4 and 7 manage funding transactions for unexpected terminations and explicit logouts of a game session. Similar to FIG. 10, FIG. 13 illustrates an established game session between the remote gaming device 802 and the remote game system 804 that terminates without the remote gaming device 802 providing explicit instructions to end the game session to the remote game system 804. The protocol sequence 1300 shown in FIG. 13 starts with a game session timeout 1302 that is substantially similar to game session timeout 1002 shown in FIG. 10. When the remote game system 804 determines that an unexpected session terminates, the remote game system 804 temporarily holds the fund within the gaming environment. In one or more implementations, to maintain funds within the gaming environment, remote game system 804 holds off on notifying the central management system 828 for a designated period and stores fund information in the remote game system 804. Additionally, or alternatively, as shown in FIG. 13, remote game system 804 sends fund information to the wagering account system 831 to temporarily store the balance in the digital gaming wallet and/or some other wallet. The wagering account system 831 may indicate that the associated funds are pending or temporarily on hold, and thus may not be available for immediate use. If the remote game system 804 is unable to re-establish the game session with remote gaming device 802 within the designated period, the remote game system 804 sends a cash out operation to the central management system 828. After the cash out operation, the funds previously temporarily on hold are transferred to the digital gaming wallet for immediate use.

In FIG. 13, the remote game system 804 sends re-login request 1304 prior to the designated period expiring. Although not explicitly shown in FIG. 13, the protocol sequence 1300 could exchange login messages between the remote gaming device 802, remote game system 804 and account management system 806 (e.g., messages 910-919 in FIG. 12) to authenticate the re-login request 1304. Based on the re-login request 1004 and after authenticating and validating the re-login request 1304, the remote game system 804 reloads the funds that were available prior to the unexpected termination of the game session onto the meter. In one or more implementations, the remote game system 804 could reload the funds based on the fund information temporarily stored on the remote game system 804 (e.g., virtual gaming service 816 in FIG. 8). In other implementations and as shown in FIG. 13, the remote game system 804 sends a re-login request and security credential 1308 to wagering account system 831. When wagering account system 831 receives the re-login request and security credential 1308, wagering account system 831 processes the message and sends a validation and reload funds message 1310 back to the remote game system. Based on the validation and reload funds message 1310, the remote game system 804 reloads the temporarily held funds onto the credit meter.

During an active game session, when the remote gaming device 802 receives instructions from one or more player inputs to end a game session for remote game play, the remote gaming device 802 sends a logout request 1314 to remote game system 804. Remote game system 804 receives logout request 1314 and generates and sends a cash out request and balance 1316 to the wagering account system 831. The cash out request and balance 1316 includes the remaining game credits and/or monetary balance left on the meter when receiving the logout request 1314 from remote gaming device 802. When wagering account system 831 receives the cash out request and balance 1316, wagering account system 831 stores and update the funds in a digital gaming wallet. Voucher account system 832 sends the updated fund balance 1318 for the digital gaming wallet to remote game system 804 and remote game system 804 stores the fund information. Afterwards, remote game system 804 sends updated fund balance 1320 for the digital gaming wallet to remote gaming device 802. When remote gaming device 802 receives the updated fund balance 1320, the remote gaming device 802 could present the updated fund balance in the digital gaming wallet within app 814.

Figure 14:
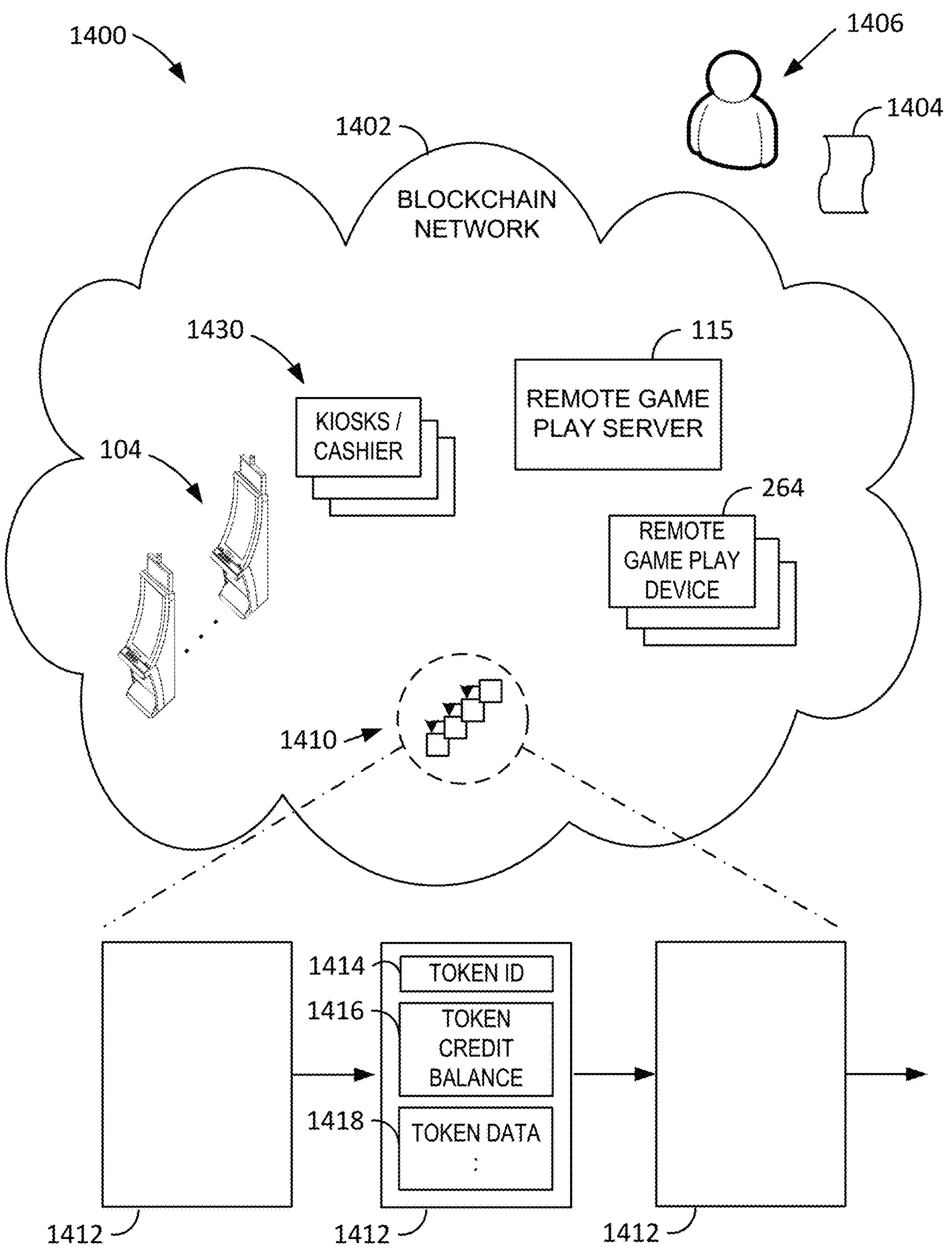
FIG. 14 is a networking environment of a remote game play system in which various devices provide remote game play services using remote game play tokens.

FIG. 14 is a networking environment of a remote game play system 1400 in which various devices provide remote game play services using remote game play tokens. In an example embodiment, the system 1400 includes a remote game play network 1402 in which various devices participate to provide for the issuance and redemption of remote game play tokens. Participating devices may include gaming devices 104 (e.g., class II of class III slots or poker machines), kiosks (or cashier devices) 1430, a remote game play server 115, and remote game play devices (or ELDs) 264 (e.g., a smart phone, a tablet computer, a personal computer, or a special purpose computing device) which may be operable to execute a remote game play application, each of which may be involved in the issuing, redeeming, managing and accounting for remote game play tokens 1404, and the remote play of an on-premise casino EGM using a, remote game play token 1404.

For example, gaming devices 104 or kiosks 1430 may be configured as issuing devices to issue remote game play tokens 1404 to players 1406, typically by printing a slip of paper, e.g., via a ticket printer 222 that the player 1406 can carry with them. In an example embodiment, gaming devices 104 or kiosks 1430 may be configured as redeeming devices to redeem remote game play tokens 1404, typically by the player 1406 inserting the token into a ticket reader 224, which can use an optical scanner to read data from the token 1404, such as a unique token identifier ("token ID"), a value, or other authentication information, each of which may be embodied in an optical label that can visually embody data, such as text, a QR code or a barcode.

In an embodiment, remote game play server 115 may manage and account for the issuance, remote play, and redemption of remote game play tokens 1404. For example, remote game play server 115 may receive game play credits from an issuing device and record the receipt of the game play credits in a remote game play database 1410. Following, the remote game play server 115 may communicate remote game play token information, e.g., a unique token ID, a token credit value, or token authentication information, to the issuing device. Further, in an example, remote game play server 115 may receive token identifying information from a redemption device and validate the token, using the token identifying information, by referencing the remote game play database 1410. Following validation, the remote game play server 115 may obtain the credit value associated with the token 1404, e.g., associated with the token unique ID, from the remote game play database 1410 and communicate the credit value to the redeeming device. Following communication of the credit value to the redeeming device the remote game play server 115 may indicate, in the remote game play database 1410, a reduced credit value, e.g., a zero credit value, associated with the unique token ID or otherwise indicate that the token 1404 has been redeemed.

In an embodiment, remote game play server 115 may receive, from a remote game play application operating on a player's 1406 remote game play device 264, token identifying information. The remote game play server 115, following token validation by the server 115, may provide to the player's 1406 device 264 an amount of credits available for remote game play, as represented by the credit value associated with the remote game play token 1404. Additionally, the remote game play server 115 may receive from a remote game play database 1410 a listing of one or more on-premise casino EGMs 104 available for remote game play and provide the listing to the player's 1406 remote game play device 264. The remote game play server 115 may then receive, from the player's remote game play device 264, a selection of an on-premise casino EGM 104 the player 1406 has selected for remote game play. The remote game play server 115 may establish a connection with the selected on-premise casino EGM 104 and, following receipt of a remote game play wager from the player's remote game play device 264, the remote game play server 115 obtains a real-time game play outcome (e.g., an RNG outcome) from the selected on-premise casino EGM 104 and provides the outcome to the player's remote game play device 264 for presentation to the player 1406 using the remote game play application.

In some instances, the remote game play server 115 may, upon connecting with a selected on-premise casino EGM 104 for a remote game play session, lock the EGM 104 to prevent an on-premise patron from playing the EGM 104, Further, in some instances, a locked EGM may display a message on, e.g., a video display that the EGM 104 is in use for remote game play. Additionally, in some instances, a locked. EGM 104 may actively present on, e.g., a video display of the EGM 104 presentation of the game as it is being played by the remote game play token player 1406, e.g., with the remote game play outcomes presented on the EGM 104 display, the credit meters updating with each wager and outcome, etc.

In some instances, the remote game play server 115 may receive remote game play outcomes from an on-premise casino EGM 104 using time-slicing. For example, a plurality of casino patrons 262 and remote game play token 1404 players 306 may select a same on-premise casino EGM 104 for remote game play. The on-premise casino EGM 104 may provide an outcome for each wager placed by the casino patron 262 and, in-between providing the on-premise wagers and/or during presentation of the outcome to the casino patron 262, also provide an outcome for each remote game play token 1404 player 1406 via the remote game play server 115.

The token 1404 represents a method of embodying pre-purchased remote game play tokens that can be of convenience to players 1406 during their gaming experiences, allowing the player 1406 to participate in real-time game play of an on-premise casino EGM 104 from a remote location and a time of their choosing. In some instances, remote play may occur, e.g., by the player 1406 at the players place of residence. In some instances, remote play may occur, e.g., by the player 1406 at a location within a resort property, but remote from resort property casino gaming floor. In some instances, remote play may occur, e.g., by the player 1406 at a location on the casino gaming floor, but at a distance from the on-premise casino EGM 104. In some instances, remote play may occur, e.g., by the player 1406 while the player is within sight of, but while not physically present at (e.g., not seated at or physical in contact with) the on-premise casino EGM 104. While the participating devices are coupled in network communication through underlying network technology not shown or described here for purposes of brevity, it should be understood that remote game play network 1402 shown in FIG. 14 represents devices participating with other devices permissioned to participate in the remote game play system 1400. Remote game play network 1402 may include any underlying networking technologies, hardware, or protocols sufficient to enable the systems and methods described herein.

In the example embodiment, the participating devices of remote game play system 1400 include one or more remote game play devices 264, which may be a mobile device such as a smart phone, a tablet, a laptop computer, a personal computer, and/or a special purpose device configured for remote game play. A remote game play device may be operable to execute a remote game play application, the remote game play application providing a remote game play user interface. In an embodiment, a player 1406 may use the remote game play application to establish a network connection with the remote game play server 115 and communicate, via the connection, remote game play token 1404 related data and information with the server 115. The player 1406, using the remote game play application user interface, may scan or otherwise input token 1404 identifying information into the remote game play application which is communicated to the server 115 for validation. Upon validation, the server 115 may communicate token remote game play information to the remote game play application, such as remote game play credits and a listing of on-premise casino EGMs 104 available for remote play.

The player 1406, in the example embodiment, may select an EGM 104 and a game offered for play on that EGM 104 for which, using game information provided by the remote game play server 115, a representation of the game is then provided on the remote gaming device 264 via the remote game application user interface. In some instances, the remote game application may present a lobby menu allowing the player 1406 to scroll through representative images of the on-premise casino EGMs 104 available for remote game play. Further, in some instances, the lobby may a virtual casino that simulates an actual casino floor layout with the placement of the representative images of on-premise casino EGMs (virtual EGMs) “positioned” within the virtual casino floor in approximately the same location in the virtual casino as they are positioned within the actual casino floor. In some instances, the virtual casino floor may be a replica of an actual casino floor, e.g., the Mirage® casino in Las Vegas, Nevada, with the virtual on-premise casino EGMs positioned within the virtual casino by, e.g., a remote game play casino operator or by the player 1406. As an example, an on-premise casino EGM remote play operator may arrange virtual on-premise casino EGMs 104 that are available for play in strategic locations within the virtual casino, e.g., placing virtual EGMs with new or popular casino games at or near an “entrance” of the virtual casino, or an on-premise casino EGM remote game player 1406 may position virtual EGMs within the virtual casino, e.g., such that virtual EGMs with the players 1406 favorite games are positioned, e.g., at or near an entrance to the virtual casino. The player 1406, upon entering a wager, e.g., selecting a number of pay-lines and an amount of credits per pay-line and pressing a ‘play’ button via the remote game play application user interface, receives a game outcome (e.g., an RNG outcome) from the on-premise casino EGM 104, via the remote game play server 115, which is presented to the player 1406 via the remote game play application user interface. In some embodiments, the on-premise casino EGM 104 may be a Class III gaming machine operable to provide a Class III game outcome and, upon receiving a request for a game outcome from remote game play server 115, the on-premise casino EGM 104 may provide an outcome, e.g., an RNG outcome, to the server 115 for communication to the players 1406 remote game play device 264. In some embodiments, the on-premise casino EGM 104 may be a Class II (e.g., bingo) gaming machine operable to provide a Class II game outcome and, upon receiving a request for a game outcome from remote game play server 115, the on-premise casino EGM 104 may, during remote play of a Class II bingo game, evaluate a bingo card against a Class II bingo server provided bingo ball call and, based on the evaluation, determine an outcome by comparing the result of the bingo card evaluation to a bingo pattern paytable, the outcome comprising a credit award. The Class II game outcome may then be communicated to the players 1406 remote game play device 264 via the remote game play server 115 as one or more of a credit award value, an RNG outcome associated with the credit award value, or an RNG seed associated with the credit award value, for presentation to the player 1406 via the remote game play application. For example, using the remote game play application the player 1406 may input token identifying information and, upon validation of the token 1404 by the server 115, observe that they have 500 remote game play credits available for play. Additionally, the player 1406 may see that their favorite slot game, Buffalo Gold®, is available for remote game play. The player 1406 may select the Buffalo Gold® game and, via the remote game play application user interface be presented with a representative display of the Buffalo Gold® game on their remote gaming device 264. Using the remote game play application user interface the player 1406 may place a 'max bet' which selects all available pay-lines (e.g., 5 pay-lines) and a maximum wager per pay-lines (e.g., 10 credits per pay-line) and press the 'spin' button. The server 115 receives the wager from the remote game play application, debits the wager amount from the token 1404 value (e.g., 500 credits−50 credits=450 credits, remaining token value) stored in the remote game play database 1410, obtains a game outcome (e.g., an RNG outcome) from the on-premise casino EGM 104 and provides the outcome to the players 1406 remote game play device 264. Upon receiving the game outcome, the remote game play application presents the outcome to the player 1406 by 'spinning the reels' of the representative Buffalo Gold® slot game on the player 1406's remote game play device 264, the reels landing in accordance with the received outcome of the game. In this example, if the player 1406 receives a losing outcome the Buffalo Gold® representative game, as displayed on the player's remote game play device 264, displays an updated credit meter (e.g., displaying 450 credits) and is enabled to allow the player 1406 to make another wager. In this example, if the player 1406 receives a winning game outcome, e.g., a winning game outcome of 1000 credits, the Buffalo Gold® representative game displays an updated credit meter (e.g., displaying 1,450 credits) and is enabled to allow the player 1406 to make another wager. In some instances, the remote game play server 115 updates the token 1404 value stored in the remote game play database 1410 as soon as the game outcome is obtained from the on-premise casino EGM. In some instances, the remote game play server 115 updates the token 1404 value after the game outcome is presented to the player 1406, e.g., via the Buffalo Gold® representative game.

In this example embodiment, if the player 1406 has completed their remote game play session and desires to 'cash-out' their winnings, (e.g., 1,450 credits), the player 1406 may return to the casino and via a redeeming device, e.g., an on-premise casino EGM 104, or kiosk/cashier 1430, scan or otherwise input their token 1404 identifying information into the remote game play system and, once the token has been validated and the token value retrieved by the remote game play server 115 from the remote game play database 1410, receive the credit value of their token 1404 as, e.g., game play credit on an on-premise casino EGM 104, or currency received from the kiosk/cashier 1430.

In an example embodiment, the remote game play server 115 and/or the remote game play application may be enabled to restrict remote game play to predetermined remote game play authorized areas or regions, e.g., within a resort or casino property, on tribal lands, or within the borders of a county, state or country. Further, the remote game play server 115 and/or remote game play application may be configured to obtain geolocation information of the players remote game play device 264, e.g., from an application running on the players remote game play device 264, to determine whether the player's device 264 is within an authorized area or region, and to disable remote game play, using the remote game play token 1404, if the player's device is not determine to be located within an authorized area or region.

In some instances, a remote game play token 1404 may be provided by a retail or casino property as a promotion, e.g., in exchange for every $100 spent at a venue (restaurant, night-club, retail outlet, etc.) a patron may receive a $5 remote game play token 1404. In some instances, remote game play using a token 1404 may be restricted or incentivized. For example, a casino may restrict or incentivize token 1404 play to days and/or times of typical low casino occupancy, e.g., a player 1406 may receive $12 play for every $10 token 1404 value for remote game play on Tuesdays. In some instances, a casino may provide a promotional token 1404 for remote game play to a player 1406 on their birthday, or for play during a major sporting event (e.g., the World Cup), or at other times when the player 1406 may be less likely to visit the casino, such as in advance of a major weather event (winter storm, etc.).

In some instances, remote game play tokens 1404 may be issued, played and redeemed without identifying the player 1406, i.e., the player 1406 can remain anonymous. In this instance, however, there is no security offered if the token 1404 is lost or stolen. In some instances, a player 1406 can remain anonymous but still add a layer of security to their token 1404 by providing a PIN when the token is purchased, the PIN required to be entered when submitting the token 1404 for remote play, and when redeeming the token 1404. In some instances, a player 1406 may associate a token 1404 with their casino patron loyalty account ("player account"). In this instance, a player 1406 is required to 'log in' or 'card in' to their player account to purchase, play and/or redeem a token 1404. Further, in this instance, if a token 1404 is lost or stolen the player 1406 may be able to, e.g., by contacting their patron loyalty account host, retrieve the lost or stolen token.

In some instances, remote game play tokens may be associated with player 406 identifying information and remote game play device 264 identifying information. As an example, player 1406 identifying information may include a player's remote game play account identification information, a player's casino loyalty account identification information, a player's government issued identification information (e.g., drivers license number, passport number, etc.). Further to this example, remote game play device 264 identifying information may include a remote game play device 264 unique ID (e.g. an IMEI number, or an identifier associated or derived from the remote game play device 264 IMEI number), or a unique identifier provided by the remote game play application operating on the remote game play device 264 (that may be associated with, e.g., the player's identifying information and/or the remote game play device 264 unique ID).

In some instances, remote game play tokens may be associated with a geolocation of the player 1406 and/or remote game play device 264 when a token 1404 transaction occurs. As an example, geolocation information (e.g., geo-coordinates, global positioning system (GPS) coordinates) may be obtained via the capabilities of the remote game play device 264 or an application operating on the remote game play device 264, to use multilateration (e.g., pseudo range multilateration) information and/or GPS coordinate information to provide geolocation information for the remote game play device 264, and associate the geolocation information with the token 1404.

In some instances, date and time information, player 1406 identifying information, remote game play device 264 identifying information, and/or remote game play device 264 geolocation information may be associated with a remote game play token 1404 upon an occurrence of a token 1404 transaction, e.g., a token 1404 issuance, validation, or redemption transaction. As an example, upon issuance of a remote game play token 1404 date and time information, player 1406 identifying information, remote game play device 264 identifying information and/or remote game play device 264 geolocation information may be communicated or otherwise provided to the remote game play server 115, and stored in the remote game play database 1410. This information may be used, e.g., to provide token 1404 security features (e.g., to prevent the unauthorized redemption of a token 1404 or to associate, e.g., a token 1404 redemption, with an individual or geolocation for token 1404 transaction tracking purposes), and to provide for token 1404 auditing and accounting features.

Figure 15A:
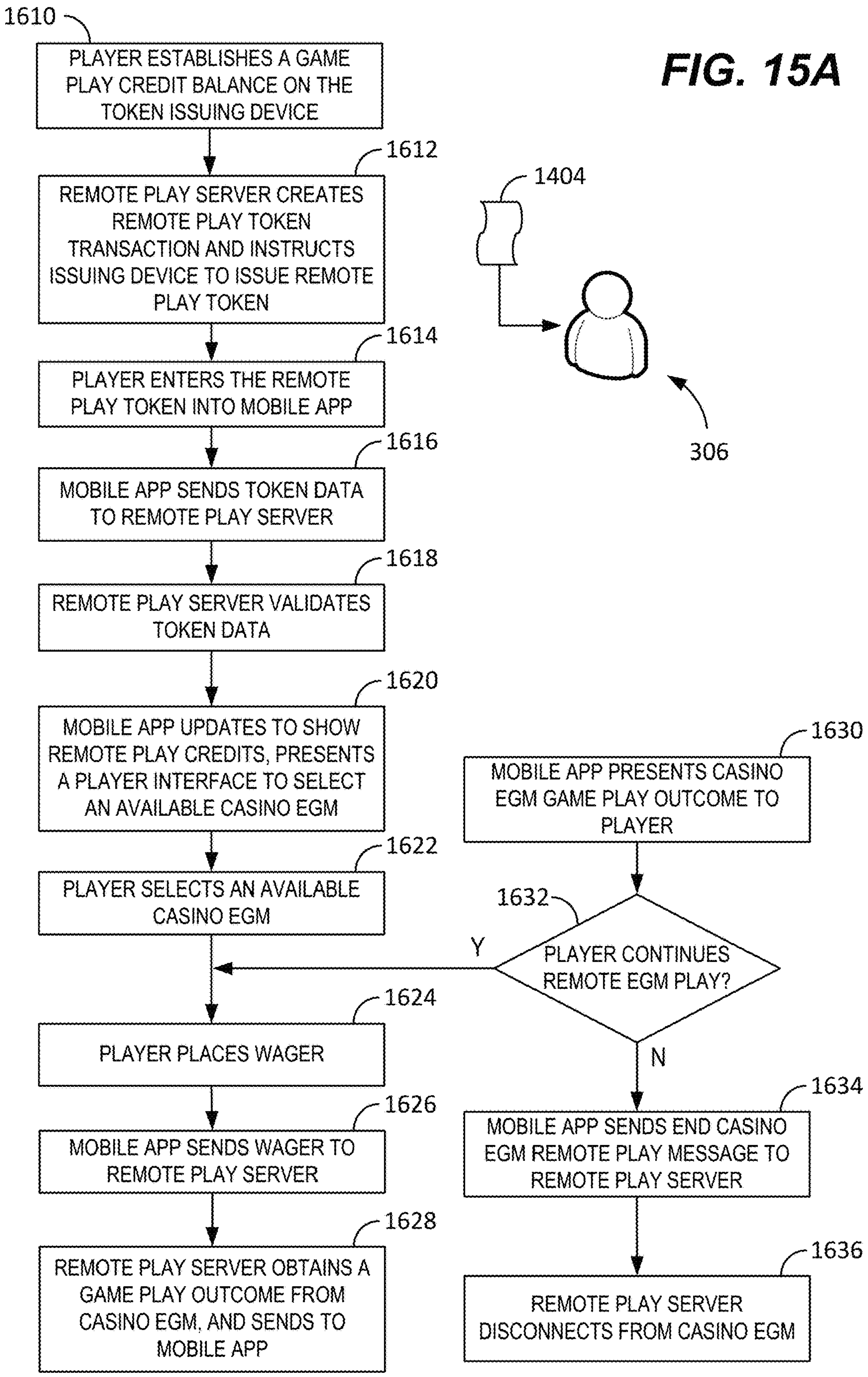
FIG. 15A illustrates an example method for a player to remotely play an on-premise EGM using the remote game play server system of FIG. 14.

FIG. 15A illustrates an example method 1500 for a player 1406 to remotely play an on-premise EGM using the remote game play server system 1400 of FIG. 14. In the example embodiment a remote game play token 1404 ("token") is purchased by the player 1406 from a remote game play token issuing device, e.g. a remote game play token issuing kiosk 1430 or a remote game play token issuing EGM 104. The token 1404 is scanned or the token identifying information is otherwise entered into a mobile remote game play application ("mobile application") on the players mobile device 264, and the token identifying information sent via a network to be validated by a remote game play server ("server") 115. The player 1406, using the mobile application, may select an available on-premise casino EGM ("EGM") and, following validation of the token by the server 115, begin live play of the EGM on their mobile device. In an instance of the method 1500, at operation 1510 a player 1406 establishes a game play credit balance on the remote game play token issuing device by, e.g., inserting currency or a cash-less ticket (e.g. a TITO ticket) into a bill validator or ticket reader of the token issuing device, the credit balance communicated via a network to the remote game play server 115. Upon receipt of the credit balance, at operation 1512 the remote game play server 115 creates a remote game play transaction, e.g., by creating and storing a remote game play token ID in a remote game play system database and associating the credit balance with the token ID, and communicates the token identifying information (e.g., the token ID) to the issuing device, which issues the remote game play token 1404 to the player 1406, e.g., as a ticket printed by the issuing device ticket printer. At operation 1514 the player 1406, having received the remote game play token 1404, using a user interface of the mobile applications enters the token identifying information into the mobile app (e.g. manually enters a token identifying string or optically scans, using their mobile device, text and/or a optically readable image (e.g. a bar code or QR code) into the mobile application. At operation 1516, following entry of the token identifying information the mobile application sends the token information to the remote game play server 115 for validation. At operation 1518 the server 115 validates the token and, if the validation is successful, replies to the mobile application with credit information and a listing, or a link to a listing, of on-premise casino EGMs available for remote play. At operation 1520 the mobile application user interface is updated to display, on one or more credit meters, remote play token related credits and on a user selection interface a menu of on-premise EGMs that are available for remote play. At operation 1522 the player 1406 selects, using the mobile application user interface, an on-premise EGM to remote play and the player 1406 selection is communicated to the remote game play server 115, and the server 115 establishes a remote play session between the selected on-premise EGM and the mobile application. At operation 1524, the player 1406 initiates remote play of the on-premise EGM by placing a wager, e.g., by selecting an amount of credits to wager and pressing a 'spin' button on the mobile application user interface, that is communicated by the mobile application to the remote game play server 115. At operation 1528, the remote game play server 115 in exchange for the wager, replies to the mobile application a real-time game play outcome obtained from the selected on-premise casino EGM. At operation 1530 the mobile application, via the remote game play user interface, presents the real-time game play outcome to the player 1406. At operation 1532, if the player 1406 continues to place wagers the example method returns to operation 1524, otherwise the example method continues to operation 1534 wherein the mobile application communicates an "end remote play" message to the remote game play server 115 and, at operation 1536, the remote game play server 115 ends the remote game play session releasing the selected on-premise casino EGM for play, e.g., by other players for on-premise or remote play.

Figure 15B:
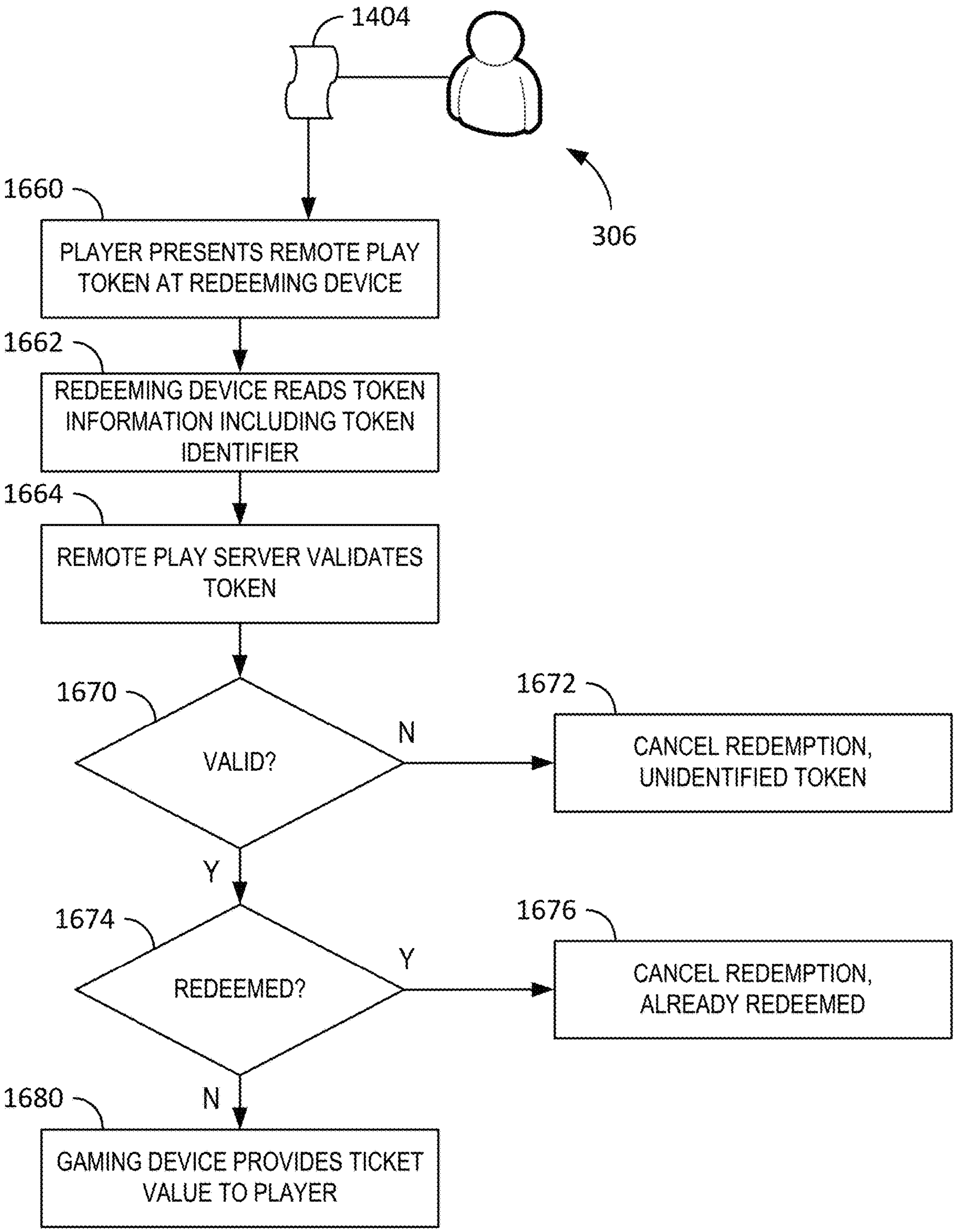
FIG. 15B illustrates an example method for a player to redeem the remote gameplay token created in FIG. 15A following, e.g., remote play of an on-premise casino EGM using the remote game play system and the network.

FIG. 15B illustrates an example method 1550 for a player 1406 to redeem the remote gameplay token 1404 created in FIG. 15A following, e.g., remote play of an on-premise casino EGM using the remote game play system 300 and the network 302. In the example embodiment, the token redemption process is described as performed by a gaming device 104 (e.g., as the "redeeming device") and in the context of a "token presentation" operation at the gaming device 104, where the player 1406 inserts the token 1404 into the redeeming device (e.g., into a ticket reader 224) in exchange for a credit balance on the gaming device 104 (e.g., to begin a game play session). However, it should be understood that this process can be performed by any participating device in the network 1402 that can redeem tokens 1404, and that can transfer value to the player 1406 in response to accepting the token 1404.

AT operation 1560, in the example embodiment, the player 1406 presents the token 1404 at the redeeming device (e.g., gaining device 104). At operation 1562, the gaming device 104 scans token information from the token 1404 (e.g., via optical scan) and determines the token ID for the token 1404, as well as optionally other information embodied on the token 1404, and the gaming device 104 sends the token information to the remote game play server 115. At operation 1564, the remote game play server 115 validates the token 1404 using the token information. The token is considered valid if the remote game play server 115 finds the token ID for the token in the remote game play system database. If, at test 1570, the token ID for that token is not found, then the redeeming device (e.g., gaming device 104) cancel redemption of the token 1404, indicating the token as unidentified at operation 1572. If, at test 1570, the token ID for the token 1404 is found in the remote game play system database 1410 then the remote game play server 115 determines whether the token has a redeemable balance of credits, e.g., associated with the token ID in the remote game play system database 1410. If, at test 1574, the remote game play server 115 finds there is no credit balance associated with the token 1404, then the remote game play server 115 cancels redemption of the token, indicating the token has no credit balance as operation 1576. Presuming the token 1404 is valid and has a credit balance, at operation 1580 the remote game play server 115 transfers the token balance to the credit meter of the redeeming device (e.g. gaming device 104). As such, the player 1406 receives, in exchange for the token balance, a credit balance on the gaming device 104.

In some instances, the remote game play server 115 participates as an administrative node in a remote game play token blockchain (not depicted in the figures). The remote game play server 115 includes blockchain software that allows for the server 115 to perform blockchain functionality such as, for example, receiving and inspecting the blockchain, broadcasting transactions into the blockchain, and creating blocks for the blockchain mining).

In an embodiment, the on-premise casino EGM 104 and kiosk/cashier 1430 participate in one or more blockchains that support remote game play tokens. Token operations may be memorialized as blockchain transactions, thereby decentralizing token management and accounting amongst the participating nodes (e.g., EGMs, cashier nodes, kiosk nodes, etc.). When a player inserts cash in the bill validator 234 or a ticket into the ticket reader 224 of a token issuing device (e.g., gaming device 104 or kiosk/cashier 1430) and requests a remote game play token 1404, the issuing device may create and broadcast a token issuance request blockchain transaction into the blockchain. Upon detection, by the remote game play server 115, of the token issuance request transaction the server 115 may create and broadcast a token issuance transaction which may include, e.g., the token ID and token credit value, into the blockchain. The token issuance transaction, when detected by the issuing device, instructs the issuing device to issue the token 1404 to the player 1406, e.g., printing a ticket from the issuing device ticket printer. Following token issuance, the issuing device creates and broadcasts a token issued transaction into the blockchain.

In an embodiment, when the player 1406 redeems a remote game play token 1404, e.g., by scanning or otherwise entering token 1404 identifying information into the redemption device, the redeeming device (e.g., gaming device 104 or kiosk/cashier 1430) creates and broadcasts a token redemption request transaction into the blockchain. Upon detection, by the remote game play server 115, of the token redemption request transaction the server 115 may validate the token and, searching the blockchain for a current token value transaction, obtain the token 1404 credit value and create and broadcast a token redemption transaction into the blockchain. The token redemption transaction, when detected by the redemption device, instructs the redemption device to redeem the token value to the player, e.g., as game play credits on the on-premise EGM 104 or as currency dispensed by the kiosk/cashier 1430. Following token redemption, the redemption device creates and broadcasts a token redeemed transaction into the blockchain.

In an embodiment, a player may scan or otherwise input token 1404 identifying information into a remote game play application on their remote game play device 264. The remote game play application may communicate the token 1404 information to the remote game play server 115. The server 115, following receipt of the token 1404 information may search the blockchain for a token issued transaction and, if found, create and broadcast a token play transaction into the blockchain and communicate the token credit value to the player's 1406 remote game play device 264. The player, via the remote game play application on their remote game play device, may select an on-premise casino EGM 104 (from a listing of on-premise casino EGMs 104 provided by the server 115) and place a wager to play a game on the EGM 104. The server 115, receiving the remote game play wager may create and broadcast a wager transaction into the blockchain. The server 115, following receipt of the wager, requests a game play outcome (e.g., an RNG outcome) from the selected EGM 104, and communicates the outcome to the player's remote game play device 264. The server 115, following receipt of the outcome, creates and broadcasts a remote game play outcome transaction, which may include the RNG outcome provided by the on-premise casino EGM 104, into the blockchain. The server 115, upon receipt of an indication that the game play outcome was presented to the player 1406 on their remote game play device 264, creates and broadcasts a wager complete transaction, which may include, e.g., the token ID and the game play outcome, into the blockchain.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

While the present disclosure has been described with respect to the figures, it will be appreciated that many modifications and changes may be made by those skilled in the art without departing from the spirit of the inventions. Any variation and derivation from the above description and figures are included in the scope of the present disclosure as defined by the claims.

What is claimed is:

1. A mobile gaming system for providing game play to a plurality of mobile devices, the mobile gaming system comprises:

a memory storing game source data that is used to evaluate game outcomes for a game;

a first game source server configured to generate and store, in the memory, the game source data for the game;

a first game source adapter configured to register a first mobile device with the first game source server, causing the first game source server to transmit the game source data to the first game source adapter; and a resolution platform, executed by at least one processor, configured to:

receive a play request for the game and associated with a first mobile device, the play request includes a first transaction amount;

receive, from the first game source adapter, the game source data;

identify a game play data set used for the play request;

prior to transmitting a first transaction request for the first transaction amount for the play request, determine an outcome for the play request by comparing the game source data with the game play data set;

after determining the outcome for the play request, transmit, to an operator server, the first transaction request for the first transaction amount, the operator server configured to perform transactions; and receive, from the operator server, a first transaction status message including a status of a first transaction associated with the first transaction request, the first transaction status message causing the status of the first transaction to be displayed on a user interface of the first mobile device.

2. The mobile gaming system of claim 1, wherein the game is a bingo-based wagering game, wherein generating the game source data for the game includes asynchronously generating a ball call for an instance of bingo independent of device participation in the game, wherein identifying the game play data set used for the play request includes identifying a bingo card for the play request, wherein comparing the game source data with the game play data set includes determining whether the ball call results in at least one pattern match on the bingo card based on one or more winning patterns defined in a pay table associated with the game.

3. The mobile gaming system of claim 1, wherein the game is a lottery-based wagering game, wherein generating the game source data for the game includes selecting a set of lottery numbers for an instance of lottery, wherein identifying the game play data set used for the play request includes identifying a lottery ticket for the play request, wherein comparing the game source data with the game play data set includes determining whether the lottery ticket matches a win condition defined in a pay table associated with the wagering game based on the selected set of lottery numbers.

4. The mobile gaming system of claim 1, wherein the game play of the game on the first mobile device includes a slot-based game facade, wherein the resolution platform, executed by the at least one processor, is further configured to:

transmit a game play start message for delivery to the first mobile device, the game play start message is configured to initiate a spin of reels in the user interface of the first mobile device; and in response to the first transaction status message indicating that the first transaction is successfully performed against a funds source account transmit results data for a spin request for delivery to the first mobile device, the results data for the spin request identifies the outcome of the spin request.

5. The mobile gaming system of claim 4, wherein the resolution platform, executed by the at least one processor, is further configured to:

generate and transmit, to an operator server, a second transaction request for a win amount, the operator server configured to credit the funds source account with the win amount for the play request; and receive, from the operator server, a second transaction status message including a status of a second transaction associated with the second transaction request, the second transaction status message causing the status of the second transaction to be displayed on the user interface of the first mobile device.

6. The mobile gaming system of claim 5, wherein the second transaction request is transmitted before the transmission of the results data, wherein the results data includes an updated balance of the funds source account after application of the win amount to the funds source account.

7. The mobile gaming system of claim 5, wherein the resolution platform, executed by the at least one processor, is further configured to:

identify a spin facade identifier that displays a spin result which evaluates to the win amount when the spin result is evaluated against a pay table for the game, wherein the results data for the spin request further includes the spin facade identifier, wherein transmission of the results data for the spin request for delivery to the first mobile device causes the first mobile device to display a spin facade associated with the spin facade identifier on the first mobile device.

8. The mobile gaming system of claim 1, wherein the operator server is a digital wallet transaction processor, and the first transaction request is a request to perform a digital wallet transaction for the first transaction amount from a funds source account included in a digital wallet of the first mobile device.

9. A computer-implemented method for providing game play to a plurality of mobile devices, the method comprising:

generating, by a first game source server, game source data for a game;

registering, by a first game source adapter paired with the first game source server, a first mobile device with the first game source server, causing the first game source adapter to receive the game source data for the game from the first game source server;

executing a resolution platform configured to:

receive a play request for a game from a first mobile device, the play request includes a first transaction amount;

receive, from the first game source adapter, the game source data;

identify a game play data set used for the play request;

determine an outcome for the play request by comparing the game source data with the game play data set;

after determining the outcome for the play request, transmit, to an operator server, a first transaction request for the first transaction amount, the operator server configured to perform transactions; and receive, from the operator server, a first transaction status message including a status of a first transaction associated with the first transaction request, the first transaction status message causing the status of the first transaction to be displayed on a user interface of the first mobile device.

10. The computer-implemented method of claim 9, wherein the game is a bingo-based wagering game that presents a slot-style facade during the game play, wherein generating the game source data for the game includes generating a bingo ball call based on output from a random number generator, wherein identifying the game play data set used for the play request includes randomly generating a bingo card for the play request, wherein comparing the game source data with the game play data set includes identifying at least one winning pattern after daubing the bingo card based on the bingo ball call.

11. The computer-implemented method of claim 9, wherein the game is a lottery-based wagering game that presents a slot-style facade during the game play, wherein generating the game source data for the game includes performing a lottery draw of a predetermined number of lottery numbers from a set of possible lottery numbers, wherein identifying the game play data set used for the play request includes generating a lottery ticket for the play request based on output from a random number generator, wherein comparing the game source data with the game play data set includes determining whether the lottery ticket matches a win condition defined by the game based on the lottery draw.

12. The computer-implemented method of claim 9, wherein the game play of the game on the first mobile device includes a slot-based game facade, the method further comprising:

transmitting a game play start message to the first mobile device, the game play start message is configured to initiate a spin of reels in the user interface of the first mobile device;

in response to the first transaction message indicating failure, cancelling the game play and discarding the outcome; and in response to the first transaction succeeding, transmitting results data for a spin request for delivery to the first mobile device, the results data for the spin request identifies the outcome of the spin request.

13. The computer-implemented method of claim 12, further comprising generating and transmitting, to the operator server, a second transaction request for a win amount, the operator server configured to credit a funds source account with the win amount for the play request; and receiving, from the operator server, a second transaction status message including a status of a second transaction associated with the second transaction request, the second transaction status message causing the status of the second transaction to be displayed on the user interface of the first mobile device.

14. The computer-implemented method of claim 13, wherein the second transaction requested is transmitted before the transmission of the results data, wherein the results data includes an updated balance of the funds source account after application of the win amount to the funds source account.

15. The computer-implemented method of claim 13, further comprising:

determining a spin facade in a slot-style reel based game which evaluates to the win amount, wherein the results data for the spin request identifies the spin facade to be displayed on the first mobile device.

16. The computer-implemented method of claim 9, wherein the first transaction is a digital wallet-based transaction for the first transaction amount from a funds source account included in a digital wallet identified by a player on the first mobile device.

17. A non-transitory computer-readable medium, readable by at least one processor and comprising instructions stored thereon that, when executed, causes the at least one processor to:

initialize a first game source server and a first game source adapter paired with the first game source server, the first game source server is configured to generate ball call information for a bingo game, the first game source adapter is configured to act as a proxy for a plurality of mobile devices with the first game source server;

assign a first mobile device with the first game source adapter, thereby causing the first game source adapter to receive the ball call information from the first game source server;

receive a play request for the bingo game from a first mobile device, the play request represents initiation of an instance of game play of the bingo game;

receive the ball call information for the instance of the bingo game;

select, from a pool of randomly generated bingo cards, a bingo card for a play request received from the first mobile device;

determine an outcome for the play request by comparing the ball call information with a bingo ticket;

after determining the outcome for the play request, transmit, to an operator server, a first transaction request for a first transaction amount, the operator server configured to perform transactions; and receive, from the operator server, a first transaction status message including a status of a first transaction associated with the first transaction request, the first transaction status message causing the status of the first transaction to be displayed on a game play user interface of the first mobile device.

18. The non-transitory computer-readable medium of claim 17, wherein the game play of the bingo game on the first mobile device includes a slot-based game facade, wherein the instructions further cause the at least one processor to:

transmit a game play start message to the first mobile device, thereby causing the game play user interface on the first mobile device to begin spinning a set of reels;

in response to the first transaction message indicating failure, cancel the game play and stop the spinning of the set of reels with a displayed error; and in response to the first transaction succeeding, transmit results data for a spin request to the first mobile device, the results data for the spin request identifies the outcome of the spin request.

19. The non-transitory computer-readable medium of claim 17, wherein the instructions further cause the at least one processor to, prior to transmitting results data to the first mobile device, generate and transmit, to an operator server, a second transaction request for a win amount, the operator server configured to credit a funds source account with the win amount for the play request; and receive, from the operator server, a second transaction status message including a status of a second transaction associated with the second transaction request, the second transaction status message causing the status of the second transaction to be displayed on the user interface of the first mobile device.

20. The non-transitory computer-readable medium of claim 17, wherein the first transaction is a digital wallet-based transaction for the first transaction amount from a funds source account included in a digital wallet identified by a player on the first mobile device.

* * * * *